INVENTORS
JOHN F. AUWAERTER
FRANK D. BIGGAM
WALTER B. McCLELLAND
BY R. C. Terry
ATTORNEY

COMMUNICATION SYSTEM

Filed Jan. 15, 1962

INVENTORS
JOHN F. AUWAERTER
FRANK D. BIGGAM
WALTER B. McCLELLAND
BY R. C. Terry
ATTORNEY INVENTORS
JOHN F. AUWAERTER
FRANK D. BIGGAM
WALTER B. McCELLAND
BY R. C. Terry
ATTORNEY INVENTORS
JOHN F. AUWAERTER
FRANK D. BIGGAM
WALTER B. McCLELLAND
BY R. C. Terry
ATTORNEY INVENTORS
JOHN F. AUWAERTER
FRANK D. BIGGAM
WALTER B. McCLELLAND
BY R.C. Perry
ATTORNEY INVENTORS
JOHN F. AUWAERTER
FRANK D. BIGGAM
WALTER B. McCLELLAND
BY R. C. Terry
ATTORNEY Aug. 10, 1965 J. F. AUWAERTER ETAL 3,200,192

COMMUNICATION SYSTEM

Filed Jan. 15, 1962

8 Sheets-Sheet 7

INVENTORS
JOHN F. AUWAERTER
FRANK D. BIGGAM
WALTER B. McCLELLAND

BY R. C. Lerry
ATTORNEY

INVENTORS
JOHN F. AUWAERTER
FRANK D. BIGGAM
WALTER B. McCLELLAND
BY R. C. Terry
ATTORNEY 3,200,192
COMMUNICATION SYSTEM John F. Auwaerter and Frank D. Biggam, Deerfield, and Walter B. McClelland, Park Ridge, Ill., assignors to Teletype Corporation, Skokie, Ill., a corporation of Delaware Filed Jan. 15, 1962, Ser. No. 166,098
5 Claims. (Cl. 178—3)

This invention relates to a data interchange system, and more particularly to apparatus for controlling the application of data signals to a single interchange circuit from a plurality of data sources. It is an object of the invention to provide an improved system and apparatus of such character.

The invention is applicable to a data distributing system such as that employed by the FAA (Federal Aviation Agency) for the rapid distribution of weather data. In that system there are fifteen "area" circuits, each of which links together a substantial number of stations which are capable of transmitting and receiving messages through the use of teletypewriter apparatus. Associated with each of the fifteen area circuits is a master station having a tape reperforator and a tape reader for recording on punched tape and for retransmitting the messages which are received from the stations of the associated area circuit. Also associated with each area circuit is local scanning apparatus which calls for transmission by the individual stations in predetermined order.

A single main circuit interconnects the master stations whereby the messages recorded by the reperforator at each of the master stations may be retransmitted by the associated reader, preferably at high speed, to all of the other master stations. At each master station this data is recorded again on perforated tape by high speed reperforators. Subsequently, this tape is read and the data is retransmitted at standard speed to the area circuits, and to other standard speed circuits which include stations for receiving only.

In such a system it will be seen that there are fifteen sources of data to be transmitted on the single, main, or high speed line. Basically, a systematic application of data signals to the high speed line is governed by a single master control center or scanner which applies station call letter signals to the high speed line in a predetermined sequence. The call letters corresponding to any given area circuit are recognized by apparatus associated with the master stations, and this recognition apparatus responds by signaling for the transmission of data by the corresponding high speed tape reader.

In accordance with the present invention, control apparatus is provided which responds to such a signal and activates the corresponding high speed reader only in the event that the requested data has been received by the associated standard speed reperforator, along with feed-out characters such that the full message-carrying portion of the tape may be physically available to the high speed reader. This control apparatus also interrupts operation of the high speed reader when all of the data has been transmitted.

These functions of the control apparatus, namely the activating of the corresponding high speed reader only when the requested message is available and the interruption of the high speed reader when the requested data has been transmitted, are complicated by the fact that the data collected from the stations of each area circuit is divided into three blocks or classes. The master control center, referred to above, is arranged to call for the first block of data from each of the fifteen area circuits, then the second block of data from each area circuit, and finally the third block of data from each area circuit. More specifically, there are 45 requests for data, each of the high speed readers being called upon three times during the scheduled scanning by the master control center.

As indicated above, in the event that the requested block of data is not available when requested, the control apparatus must refrain from activating its high speed reader, in which case the master control center continues its scheduled scanning of the area circuits. When the next block of data from this area circuit is requested, the control apparatus must activate its high speed reader to transmit not only the previously unavailable block of data, if it is now available, but must continue the activation of its high speed reader to send the presently requested block of data, if it also is now available.

These functions of the control apparatus are still further complicated by the fact that provision is made for the unscheduled scanning of the system by the master control center. Such an unscheduled scan is initiated when an unscheduled message is recorded by any one of the low speed reperforators, an unscheduled message being one which is sent at the discretion of a station operator and not as part of an area circuit scan. An unscheduled scan of the fifteen high speed transmitters is also initiated when a scheduled block of data is received late and is not yet transmitted when the scheduled scan is ended. The control apparatus must recognize the reception of one or more late messages or unscheduled messages by its associated low speed reader, and direct the master control center to begin an unscheduled scan, the signal by which the control apparatus so directs the master control center being effective even in the event that one or more of the other control apparatuses simultaneously directs the master control center to initiate an unscheduled scan. The control apparatus, when subsequently signaled by the associated station-call recognition apparatus, must activate its high speed reader not only in the event that it has an unscheduled message available, but also in the event that it has available a scheduled message which was not available during the last scheduled scan.

Still further, the control apparatus must count unscheduled messages as received such that it will not interrupt its high speed reader until the latter has sent out any late scheduled messages and the last of a plurality of unscheduled messages which may have been received.

Still further, the control apparatus must be arranged to permit the transmission of any requested data, whether it be block 2, block 3, or unscheduled data, even though such data is received, and first becomes available for transmission, during the actual transmission of a preceding block of data or unscheduled message.

Acordingly, it is another object of the invention to provide an improved automatic data interchange system wherein a predetermined sequence of application of messages to a single interchange circuit from a plurality of cources is automatically controlled in accordance with the availability of messages at the various sources.

It is a further object of the invention to provide improved control apparatus for automatically varying a predetermined sequence of data accumulation in such a system in accordance with the availability of data.

Another object of the invention is to provide improved control apparatus for a data interchange system which assures the collection of all available messages even though one or more messages may have become available subsequent to a scheduled request therefor.

Still another object of the invention is to provide improved control apparatus for a data interchange system which provides for the actuation of a transmitter in response to a request for data, even though the requested data is not available, provided that there is available earlier data which was not available when specifically requested, and which provides for continued actuation to transmit the requested data in the event that it becomes available while the earlier data is being transmitted.

It is another object of the invention to provide improved control apparatus for a data interchange system, which apparatus includes novel means for delaying transmission of a signal which is indicative of the recording of a block of data on a continuous elongated record until a prescribed quantity of additional data is recorded such that the block of data is physically available to a record translating device.

It is still another object of the invention to provide improved delay means on the character described above.

It is a further object of the invention to provide improved control apparatus for a data interchange system, which apparatus is arranged to initiate a scan of record translating devices in response to the completion of a scheduled scanning of the devices while data remains recorded and not transmitted.

Another object of the invention is to provide improved apparatus in a data interchange system, which apparatus initiates transmission by a record translating device in response to the presence of a block of data, and counts blocks of data recorded and blocks of data transmitted, and continues operation of the transmitting device until the count of messages recorded and not yet transmitted reaches zero.

Still another object of the invention is to provide an improved automatic data interchange system and control apparatus therefor having various of the characteristics set forth above while being simple in form, reliable in operation, and inexpensive to manufacture.

The invention, together with further objects and advantages thereof, will best be understood by reference to the following description taken in connection with the accompanying drawings, in which.

Figure 1:
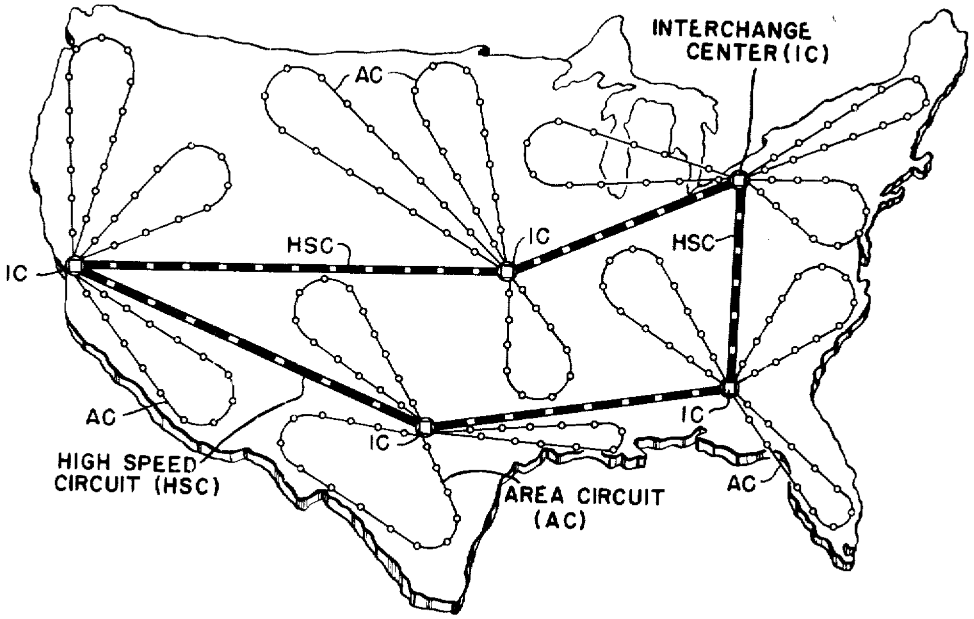
FIG. 1 PRIOR ART
FIG. 1 is a diagrammatic showing of a data interchange system to which the present invention is applicable.

Various abbreviations and acronyms employed in the drawings and the specification are listed below along with the corresponding expanded title:

| | |
|---|---|
| AC | Area Circuit. |
| HSC | High Speed Circuit. |
| LC | Local Circuit. |
| SC | Supplemental Circuit. |
| IC | Interchange Center. |
| SRC | Send-Receive Center. |
| APUHS | Automatic Program Unit, High Speed—for scanning the high speed circuit. |
| APULS | Automatic Program Unit, Low Speed—for scanning the low speed circuit. |
| HISRED | High Speed Receiving Distributor. |
| HISTRAD | High Speed Transmitting Distributor. |
| H. S. REPERF | High Speed Reperforator. |
| H. S. TRANS | High Speed Transmitter. |
| L. S. REPERF | Low Speed Reperforator. |
| L. S. TRANS | Low Speed Transmitter. |
| MULSTO | Multiple Storage Unit—for storing message addresses pending interpretation and switching. |
| SUBSET | Carrier Telegraph Conversion Unit—for converting D.C. pulses to A.C. signals of differing frequencies, and for reconverting to D.C. pulses. |

As indicated above, the present invention is applicable to a data distributing system such as that employed by the FAA for the rapid distribution of weather data. In order that the invention may be better understood, that system is described herewith in some detail.

In FIG. 1 a prior art system linking high speed and standard speed telegraph circuits is shown in which the message relaying or switching system of this invention may be used. Fifteen area circuits designated AC are shown, which circuits, in combination, cover the area of the 48 States. Each of these circuits includes a substantial number of stations at which there is provided standard speed teletypewriter transmitting and receiving apparatus. Each of the fifteen area circuits is connected to an interchange center designated IC in the drawings, which serves as a collecting and distributing center for three of the area circuits.

At each interchange center there are three standard speed teletypewriter reperforators, one associated with each of the area circuits, for recording on punched tape messages which are transmitted by all of the stations on the associated area circuit. A reperforator suitable for use in this application is disclosed and claimed in Zenner Patent No. 2,490,608, issued December 6, 1949.

Associated with each of the three standard speed reperforators is a high speed teletypewriter reader which, when actuated, reads the tape perforated by the associated standard speed reperforator and translates the information into electrical signals which are passed out over a single high speed circuit, designated HSC, which interconnects the five interchange centers. A high speed reader suitable for use in this application is disclosed and claimed in Zenner Patent No. 2,659,767, issued November 17, 1953.

As is generally understood by those familiar with the present teletypewriter art, standard speed reperforators and readers are those which operate at a rate in the vicinity of 100 words or 600 characters per minute, while high speed reperforators and readers are those which operate at speeds on the order of 1000 words or 6000 characters per minute. In the interest of simplicity and clarity these are hereinafter referred to as low speed and high speed apparatus, respectively.

The retransmitted messages are selectively recorded on punched tape by high speed reperforators at any of the interchange centers, including the interchange center from which a given message is transmitted. Subsequently, this tape is read by standard speed readers and the data is sent out over the area circuits such that it may be received by the individual stations.

Figure 2:
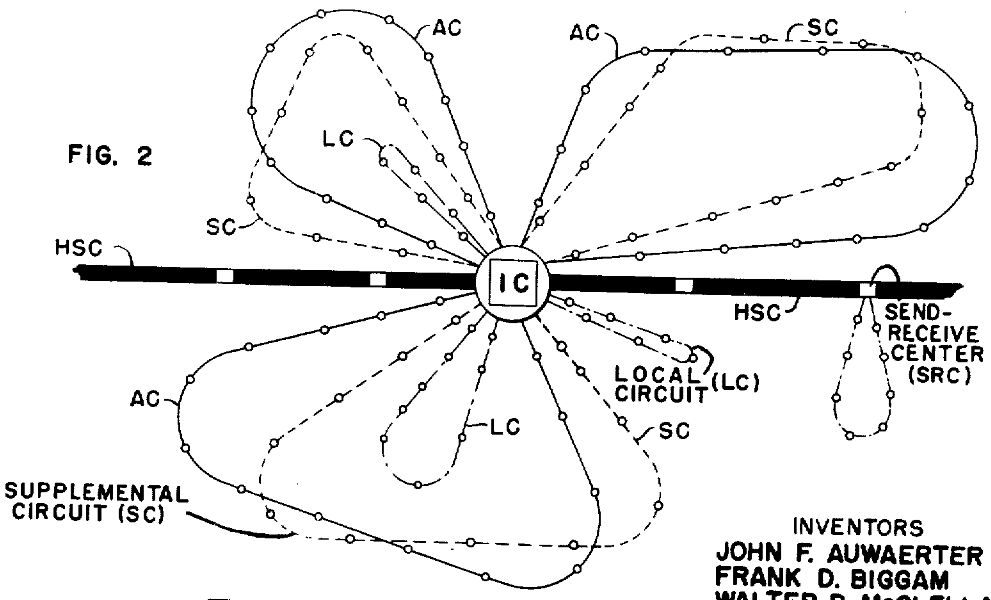
FIG. 2 is an enlarged diagrammatic showing of a portion of the system of FIG. 1, including an interchange center and various circuits associated therewith.
Figure 16:
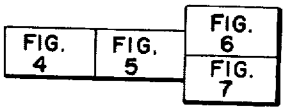

As is indicated in FIG. 2, each interchange center is connected not only to three area circuits, which contain send-receive stations, but also to three supplemental circuits designated SC in FIG. 2 and to three local circuits designated LC in FIG. 2. The supplemental circuits and local circuits serve receiving stations only, as distinguished from the send-receive stations on the area circuits.

Additional stations which receive messages but do not send, are arranged in circuits which are connected to the system through send-receive centers designated SRC in FIG. 2. These centers, as their name suggests, are able to transmit, but they do not transmit on a scheduled basis. Still further, additional receive-only stations (not specifically illustrated in the drawing) are arranged in the area circuits.

In this general manner, this data interchange system provides for some 600 stations to report weather hourly, and in some cases, three times per hour, this data being distributed selectively to some 3300 stations throughout the country.

Figure 3:
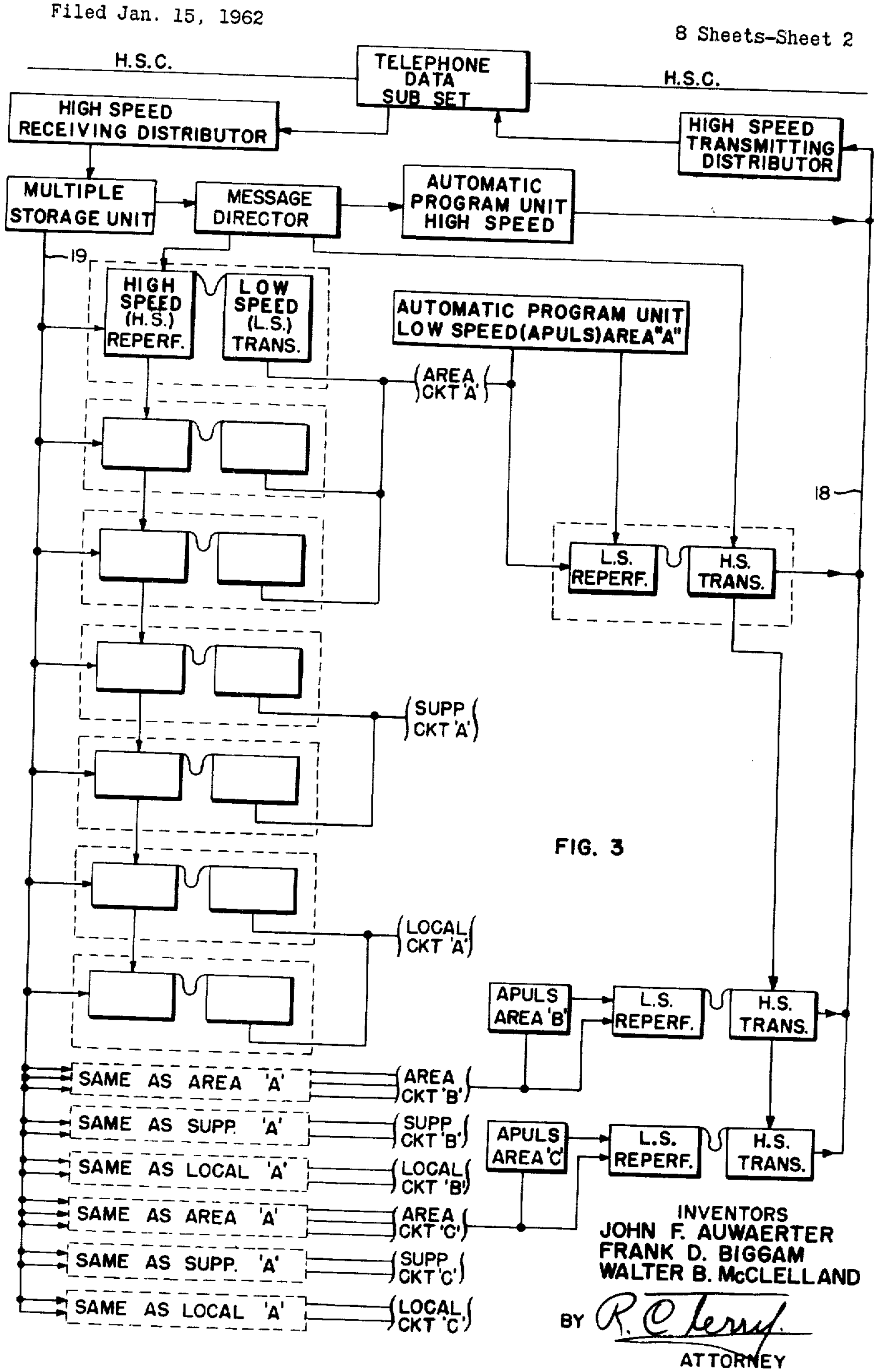
FIG. 3 is a block diagram showing the relationship of the various functional portions of an interchange center such as that represented in FIG. 2.

A more complete, but still general, description of the operations which take place at an interchange center is next set forth, with specific reference being made to FIG. 3. The entire figure encompasses one interchange center, the high speed circuit HSC extending across the top of the figure. Arranged in a vertical row down the center of the figure there are represented three area circuits, three supplemental circuits and three local circuits, each of these being arbitrarily designated "A," "B," or "C."

As a starting point in the operation of the interchange center let it be assumed that the individual stations of each of the three area circuits are sending their messages to the associated low speed reperforator under the control of an associated low speed automatic program unit, this unit being designated APULS in the drawings and hereinafter referred to as such. More specifically the send-receive stations of area circuit A near the top center of FIG. 3 are being scanned by APULS of area A, shown immediately thereabove, such that the individual send-receive stations are called upon in sequence to transmit their data to the low speed reperforator shown to the right of and below area circuit A. Similarly, the send-receive stations of area circuit B, shown at the lower center of FIG. 3, are being scanned by APULS of area B such that the individual send-receive stations transmit their data in sequence to the associated low speed reperforator, and the send-receive stations of area circuit C under the influence of APULS of area C transmit their data to the associated low speed reperforator.

The APULS units may be of various known forms such as the unit disclosed and claimed in Branson et al. Patent No. 2,430,447, issued November 11, 1947. Since these units may be of known form and do not, of themselves, constitute a feature of the present invention they are not shown or described in detail herein.

As indicated above, the send-receive stations included in any one area circuit are divided into three groups or blocks. The associated APULS scans the area circuit in such sequence that the block 1 stations are polled first, after which the block 2 and then the block 3 stations are polled. The purpose of this is to permit the collection and distribution of representative weather data as rapidly as possible, the block 1 send-receive stations being so selected that the data given by those stations provides an over-all picture of the weather at the more important locations. This general or skeletal picture of the weather is then supplemented by the collection and distribution of data coming from the block 2 and block 3 send-receive stations of the fifteen area circuits.

Following the completion of the scanning of the stations comprising a block, APULS transmits an end-of-block signal, hereinafter referred to as an EOB signal, which is recorded on tape by the associated low speed reperforator. The sending of the EOB signal may be considered simply as part of the scan. This EOB signal may thereafter be detected at various stages to indicate reception or transmission of the block of messages.

Associated with each low speed reperforator is a high speed reader or transmitter as shown in FIG. 3. Tape which is perforated by any one of the three low speed reperforators may accumulate in substantial quantity for subsequent reading by the associated high speed transmitter.

The fifteen high speed transmitters of the system are scanned in sequence and each is directed to transmit the data contained in the accumulated tape by a single master control center or high speed automatic program unit, hereinafter referred to as APUHS. While APUHS is shown in FIG. 3, in the upper center thereof, as a part of the illustrated interchange center, there is only one APUHS for the entire system, it being physically located at any one of the five interchange centers. This high speed programming unit, like the APULS units, may be of known form and is therefore not shown or described in detail herein.

APUHS calls upon each of the fifteen high speed transmitters three times during each scheduled scan, calling first for the block 1 data and then for the block 2 data and finally for the block 3 data. Such a scheduled scan may be initiated manually or by a clock. It is also arranged to conduct an unscheduled scan when suitably stimulated by apparatus described in detail below. In an unscheduled scan each high speed transmitter is called upon once, and, in addition, each of the send-receive centers SRC, shown in FIGS. 1 and 2, is called upon. It will be appreciated that APUHS performs substantially the same function relative to the fifteen high speed transmitters of the entire system as does any one of the fifteen APULS units relative to the low speed transmitters located at the send-receive stations of the associated area circuit.

At such time as APUHS directs any given high speed transmitter to transmit the data which appears on the supply of perforated tape stored between it and its associated low speed reperforator, the transmitter is activated through circuitry which is described in detail below.

The messages transmitted by a high speed reader are applied to a five-wire line 18 at the right in FIG. 3 and through a high speed transmitting distributor designated HISTRAD for converting the signals from parallel to serial form. This distributor may be of the type disclosed and claimed in Ostendorf Patent No. 2,998,486, issued August 29, 1961 and is not shown or described herein.

The serialized signal is carried to a subset for conversion to a more suitable form for long distance transmission. It will be appreciated by those skilled in the art that the signals transmitted by most conventional punched tape readers are in the form of D.C. pulses, whether they are in parallel or have been serialized. A more suitable form of signal for long distance transmission is alternating voltage of suitable frequencies. The subset included in the data interchange system shown in the drawings comprises a carrier telegraph conversion unit. This instrument converts D.C. pulses of two different magnitudes to alternating current pulses of two different frequencies, namely, 1300 cycles and 1900 cycles per second. Since this device, and others which serve a similar function, are in common use, it is not described in detail herein.

Data signals in this form circulate throughout the entire high speed circuit, and at each interchange center, including the interchange center which is at the moment transmitting data signals, the signal is reconverted first to serial D.C. pulses by the subset and then to parallel D.C. pulses by a serial-to-parallel high speed receiving distributor designated in the drawing as HISRED, shown at the upper left of FIG. 3. A suitable distributor for the present application is disclosed and claimed in Mahoney et al. Patent No. 3,001,010, issued September 19, 1961 with particular reference being made to FIGS. 2, 3 and 4 thereof.

The data is then fed onto a five-wire line 19, and selectively to one or more high speed reperforators out of a group of 21. A suitable form of high speed reperforator for this application is disclosed and claimed in Zenner Patent No. 2,675,078, issued April 13, 1954. It will be noted that there are three high speed reperforators for area circuit A and that there are two each for supplemental circuit A and local circuit A. There are like numbers of high speed reperforators for the B circuits and the C circuits.

Three high speed reperforators are employed for each area circuit since it is desired that the data which is supplied be arranged in three different priorities in accordance with a predetermined schedule. By way of example, the interests of the stations on a given area circuit might call for certain block 1 data from certain remote stations to be classified as priority 3, in which case this information would be received and stored in the third priority high speed reperforator. Other block 1 information from stations which are close by or which are considered key locations might be considered first priority information, in which case this information would be stored in the first priority high speed reperforator. More generally, the data received from any one send-receive station can be classified by any given area circuit as being of first, second or third priority and can be received by the corresponding one of the three high speed reperforators associated with that area circuit.

In a similar manner, data may be classified as first or second priority data in connection with each supplemental circuit and each local circuit and be recorded by the corresponding one of the two high speed reperforators associated therewith.

In order that a selected one or more of the 21 high speed reperforators of an interchange center may be activated to receive from the high speed circuit a message which is about to be transmitted, apparatus is provided which recognizes the address of the source of the message about to be transmitted, and, in effect, directs the message to selected ones of the 21 high speed reperforators in accordance with a predetermined schedule. The apparatus which so recognizes the address and so directs the message is designated message director in FIG. 3.

Also shown in FIG. 3 is a block designated MULSTO. This block represents apparatus for storing signals corresponding to a plurality of message characters or letters prior to their being sent on to the high speed reperforators for storage on perforated tape. The purpose of temporary storage in the MULSTO unit is to preserve the characters comprising the address of the source of a message while those characters are being detected by the message director and during the time required for the message director to actuate or connect the appropriate high speed reperforators.

The apparatus comprising the message director and the MULSTO unit does not of itself constitute a feature of the present invention and it may be of previously known form. Preferably it is of the form disclosed and claimed in copending application of S. Silberg, Serial No. 166,286, filed January 15, 1962, now Patent No. 3,147,339, issued September 1, 1964.

Various messages transmitted over the high speed circuit HSC during a given scan of the system are thus received selectively by the 21 high speed reperforators of each interchange center. The messages accepted and received by any given high speed reperforator are recorded on punched tape which is permitted to accumulate between the reperforator and the associated one of 21 low speed transmitters.

The three low speed transmitters associated with any one area circuit, and the two low speed transmitters associated with any one supplemental circuit or local circuit are called upon, on a priority basis, to transmit their messages to the associated circuit.

The apparatus for controlling the three low speed transmitters associated with any area circuit, or the two low speed transmitters associated with any supplemental circuit or local circuit is arranged to start transmission by the top priority transmitter when it has data awaiting transmission and the associated low speed circuit is not busy with a scan by APULS or transmission by a low speed transmitter of inferior priority. The apparatus permits the top priority transmitter to transmit all of the data it has in storage. When a transmitter of lesser priority is transmitting to the line, and completes the transmission of a message, and even though it may have additional messages in storage, it affords access to the line by APULS, primarily, for a scan, and secondarily, by a transmitter of superior priority. In the case of the supplemental and local circuits, APULS is not involved. A suitable form of low speed transmitter is disclosed in Gubish Patent No. 2,348,214, granted May 9, 1944.

A detailed description now follows covering the apparatus through which transmission by the high speed transmitters is controlled. This control apparatus, shown in FIGS. 4–15 serves to actuate the high speed readers and to interrupt operation of the high speed readers, both of these functions being effected only under proper circumstances. More specifically, the control apparatus activates the associated reader only when two conditions exist, namely that a block of messages is requested of the reader and that the requested block or an earlier requested block is available to the reader.

In the case of unscheduled messages the end of a message is denoted by an end-of-message signal transmitted by the source station and forming a part of the message. This end-of-message signal must be detected as received by the low speed reperforator in order that an indication may be derived that a message has been received and is awaiting transmission.

Figure 4:
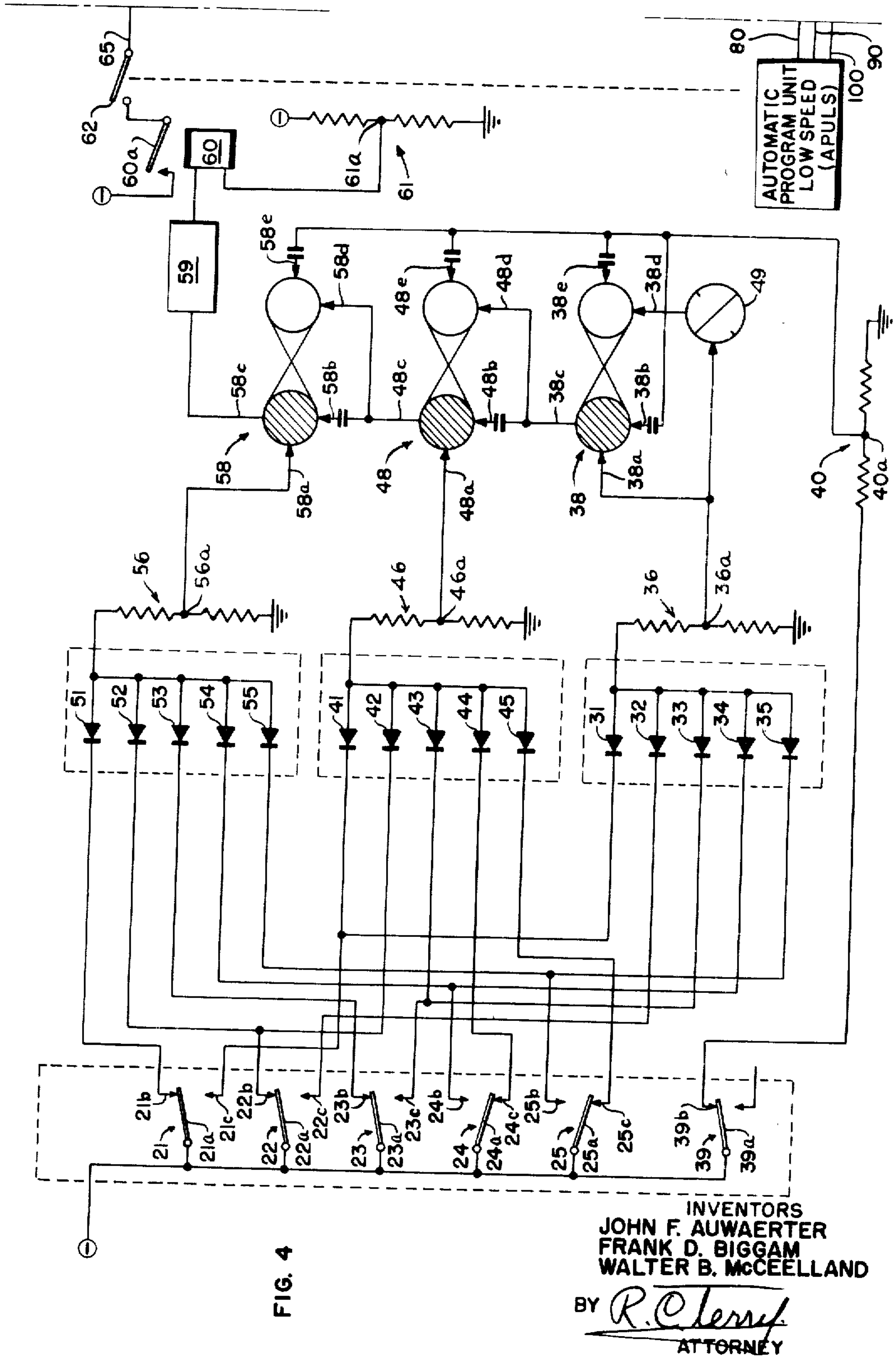
FIG. 4 is a diagram of circuitry for initiating a "message available" signal, the circuitry for initiating an unscheduled "message available" signal being shown in detail and the apparatus for producing a "scheduled message available" signal being shown in block form.

The apparatus which recognizes an end-of-message signal, hereinafter referred to as an EOM, is shown in FIG. 4. As the characters of a message, including the three characters which comprise an EOM, are punched into tape by the low speed reperforator of an interchange center, a series of five single-pole, double-throw switches 21–25 are actuated such that their movable contacts 21*a*–25*a* are thrown selectively to their upper or lower portions, depending upon whether the signal received in the corresponding binary order or level is a mark or a space. More particularly, the movable contacts 21*a*–25*a* are actuated in accordance with the corresponding five punches of the five-level tape reperforator. As will be recognized by those skilled in the art, such switches are commonly available within a tape reperforator.

With the contacts brought to their proper positions in accordance with the character being recorded by the reperforator punches, the power source shown on the upper left of FIG. 3 is connected selectively to the upper and lower fixed contacts of the corresponding switches, these fixed contacts being designated 21*b* and 21*c*, respectively, in the switch 21, and correspondingly designated in the other switches 22–25.

In FIG. 4 the first three switches 21, 22 and 23 are shown with their movable contacts in their raised positions wherein the power source is connected to the upper contacts 21*b*, 22*b* and 23*b* leaving the corresponding lower contacts 21*c*, 22*c* and 23*c* de-energized. The last two switches 24 and 25 have their movable contacts in their lower positions wherein they engage the lower contacts 24*c* and 25*c*, leaving the upper contacts 24*b* and 25*b* de-energized.

Under these circumstances each of five lines leading from these five switches to a series of five diodes 31–35 and to an associated voltage divider 36 is de-energized. Accordingly, no voltage is applied through any of these diodes to the voltage divider 36. If any one of the movable switch contacts 21*a*–25*a* were in a position other than that illustrated, the power source would be connected to one of the diodes 31–35 and voltages would be applied across the voltage divider 36 such that a −6 volt signal would appear at its tap 36*a*. For example, if the movable contact 22 were in its lower position, voltage would be applied to the fixed contact 22*c* with the result that voltage would be applied to the diode 32. Similarly, if the movable contact 24*a* were in its raised position, voltage would be applied to the fixed contact 24*b* and to the diode 34.

When the associated low speed reperforator receives the permutative five-level binary coded signals which actuate the five switches 21–25 of the reperforator to the positions shown in FIG. 4, the resulting transition of the tap 36*a* from −6 volts to zero or ground voltage primes a flip-flop circuit 38 through application of this signal to a priming terminal *a*, such that the flip-flop is reversible in its setting upon receipt of a setting signal.

The signal for setting the flip-flop circuit 38 is derived from a timing switch 39 associated with the switches 21–25. Again, it will be recognized by those skilled in the art that a timing switch is commonly available within a tape reperforator, this switch operating in conjunction with the sampling of the incoming signals to determine whether they are mark or space signals. In the present application, the switch 39 is employed to apply a setting signal to the flip-flop circuit 38 at an instant when the flip-flop is primed, or unprimed, in accordance with the condition of the switches 21–25.

Normally, the switch 39 is in the condition illustrated, wherein its movable contact 39*a* engages the upper fixed contact 39*b*. Under these circumstances, the power source is connected to a voltage divider 40 with the result that a −6 volt signal appears at the tap 40*a* thereof. This voltage is connected as shown to a setting terminal *b* of the flip-flop circuit 38. The flip-flop circuit is so designed that a positive going signal on the setting terminal *b* will set the flip-flop provided that the flip-flop is primed by a zero voltage on the priming terminal *a*. Accordingly, the flip-flop 38 will not be set, even though primed, until the switch 39 is actuated to disconnect the power supply from the voltage divider tap 40*a*, and hence the setting terminal *b* of the flip-flop 38, moves to zero or ground voltage. When the flip-flop 38 is driven to its set position, the output terminal *c* thereof is driven from a normal zero or ground voltage to −6 volts.

The flip-flop 38 may be of any one of many conventional and well known forms. It may incorporate electron tubes, transistors, relays or other devices. It is necessary that it have two positions or conditions, with there being different outputs under the two conditions. This flip-flop, and others referred to herein, are to be considered as including "and" gates and/or "or" gates such that two signals, generally referred to as a priming signal and a setting signal, may be required to actuate the flip-flop and such that either of two different signals may serve as either the priming or setting signal.

In most instances the flip-flops referred to herein are bistable in character as viewed from outside, whereas, in at least one instance a monostable flip-flop is employed. In all cases the terminals to which a pulse constituting the setting or resetting signal is to be applied is shown as including a capacitor. This serves to distinguish the setting and resetting terminals from the priming terminals. The output terminal or terminals are distinguishable by virtue of having no inwardly directed arrowhead associated therewith.

When the next character of the EOM is received, it is such that the movable contact of switches 21, 23, 24 and 25 have their movable contacts moved against the associated upper contacts while the switch 22 will have its movable contact moved into engagement with its lower stationary contact 22*b*. Under this single combination of switch conditions the five lines leading from the switches 21–25 to a second series of five diodes 41–45 and to an associated voltage divider 46 are de-energized, since none are connected to the power supply. Accordingly, no voltage is supplied to the voltage divider 46, and the tap 46*a* of the voltage divider is at zero or ground voltage.

The tap 46*a* of the voltage divider 46 is connected to a priming terminal *a* of a flip-flop 48, which is primed for setting when the tap 46*a* is at zero voltage. The priming of the flip-flop 48 for setting is accomplished in the same manner as in the case of the flip-flop 38 with the exception that the five diodes 41–45 associated with the flip-flop 48 are wired to a different combination of stationary contacts of the switches 21–25, whereby the second flip-flop 48 is primed for setting by a different character as received by the low speed reperforator.

Reception of this second character of the EOM results in voltage being re-applied to the voltage divider 36. Specifically, voltage is applied to the diodes 32, 34 and 35 as may readily be determined by tracing the leads from those diodes to the stationary contacts of the switches 21–25.

The tap 36*a* of the voltage divider 36 is connected to a second priming terminal *d* of the flip-flop 38 through an inverter 49 whose function is, as its name indicates, to invert the polarity of the signal. More specifically, a zero or priming signal is applied to the terminal *d* when a −6 volt signal appears on the tap 36*a*. Since the inverter 49 may be of conventional form, well understood in the art, it is not shown or described in detail herein.

When the second character of the EOM is received, the voltage of the tap 36*a* changes from zero to −6 volts, and the voltage applied to the priming terminal *d* of the flip-flop 38 changes from −6 to zero volts. The flip-flop 38 is therefore primed for resetting.

When the timing switch 39 opens during reception of the second character, the tap 40*a* of the voltage divider 40 again moves from −6 volts to zero or ground voltage, and this voltage is applied, as shown, to a reset terminal *e* of the flip-flop 38. If the flip-flop has been primed for resetting by the appearance of a zero voltage on the priming terminal *d*, the positive going signal applied to the reset terminal *e* causes resetting of the flip-flop 38, whereupon the output terminal *c* changes from −6 volts to zero or ground voltage. This voltage is applied, as shown, to the set terminal *b* of the second flip-flop 48 such that this flip-flop is driven to the set position. It will be recalled that the flip-flop 48 was primed for setting by application of zero voltage to its priming terminal *a*. Setting of the flip-flop 48 causes the output terminal *c* of this flip-flop to move from a normal zero or ground voltage to −6 volts.

The output terminal *c* of the flip-flop 38, in addition to being connected to the setting terminal *b* of the flip-flop 48, is also connected to a terminal *d* of the flip-flop 48 to prime the latter for resetting. However, the priming of the flip-flop 48 for resetting is delayed by a simple R-C network such that it is not effective until the next character has been received. More specifically, a reset pulse is applied to a reset terminal *e* of the flip-flop 48 from the voltage divider 40, but it is spent by the time the delayed priming signal becomes effective. Accordingly, the positive going pulse on terminal *c* of the flip-flop 38 sets the flip-flop 48 (which is primed for setting by reception of the second EOM character) and primes the flip-flop 48 for resetting upon reception of a third character. Since the R-C network may be considered as being incorporated within the flip-flop 48 and is conventional in form it is not shown separately of the flip-flop in the drawing.

It will be appreciated by those skilled in the art that each time the first character of the EOM is transmitted, the first flip-flop 38 attains set condition, and when the succeeding character is transmitted, assuming that it is not a repetition of the first character, the flip-flop 38 is reset. This applies a set voltage to the setting terminal *b* of the second flip-flop 48. This second flip-flop does not attain set condition however, unless it has been primed by the reception of the second character of the EOM immediately following the first character of the EOM.

Similarly, the second flip-flop 48 is primed for setting each time that the second character of the EOM is transmitted. This flip-flop does not, however, attain set condition unless this character is immediately preceded by the first character of the EOM.

When the third character of the EOM is received, it actuates the five switches 21–25 such that their movable contacts engage the corresponding lower stationary contacts. Under these conditions, the five leads extending from the five switches 21–25 to a third set of five diodes 51–55 are de-energized such that there is no voltage across an associated voltage divider 56, and zero or ground voltage appears on its tap 56*a*. This tap is connected to a priming terminal *a* of a third flip-flop 58, and the zero voltage thus applied thereto primes this circuit for setting.

A setting signal is derived from the second flip-flop 48 by virtue of its being reset. Resetting of the flip-flop 48 occurs because the flip-flop 38, remaining in reset condition, primes the *d* terminal of the flip-flop 48 for resetting, as explained above. Resetting is accomplished when the timing switch 39 is actuated during the reception of the third character, the positive going signal derived from the tap 40*a* of the voltage divider 40 being applied to the reset terminal *e* of the flip-flop 48. With this second flip-flop primed for resetting by the application of zero voltage to its priming terminal *d*, the application of the positive going signal to the reset terminal *e* causes resetting thereof.

Resetting of the flip-flop 48 causes the output terminal *c* thereof to move from −6 volts to zero or ground voltage. This positive going signal is applied to the setting terminal *b* of the flip-flop 58, and since this third flip-flop is primed for setting by the zero voltage applied to its priming terminal *a*, the flip-flop 58 attains set condition.

Setting of the flip-flop 58 produces a voltage on the output terminal *c* thereof. This voltage is fed to a relay drive circuit 59 of conventional form which is of sufficient sensitivity that it can close the circuit of an electromagnetic relay 60. Power for energization of the relay 60 is derived from a power source shown immediately therebelow, operating through a voltage divider 61, the relay being connected between the relay drive circuit 59 and a tap 61*a* of the voltage divider 61.

Actuation of the relay 60 closes its contacts 60*a* whereby a power source is connected to a line 65 through a switch 62. The switch 62 is controlled by APULS as indicated by the broken line at the right-hand end of FIG. 4.

Returning to the three flip-flop circuits 38, 48 and 58, it should be noted that when the next character following the three EOM characters is received, and regardless of what that character might be, the third flip-flop 58 is reset, which in turn causes the relay 60 to become de-energized. This is accomplished by virtue of the fact that the flip-flop 48 has been reset as previously described. This results in the application of a zero voltage to a priming terminal *d* of the third flip-flop such that this third flip-flop is primed for resetting. Resetting occurs when the timing switch 39 causes the application of a positive going signal to a reset terminal *e* of the third flip-flop.

It will now be seen through actuation of the switches 21–25 of a low speed reperforator, as the latter receives an unscheduled message from any one of the send-receive stations of the associated area circuit, individual characters of an EOM will be recognized by one of the three groups of five diodes 31–35 or 41–45 or 51–55 with the associated voltage divider. Recognition of the individual characters of an EOM primes the corresponding flip-flop circuits for setting by the timing signal which originates from the timing switch 39.

In the event that the three characters of an EOM are received in proper order, and in sequence, the three flip-flop circuits 38, 48 and 58 attain set condition in sucession such that an "EOM received" signal is derived by the pulse amplifier 59 and the relay 60, this signal culminating in a voltage applied to the line 65 at the upper right of FIG. 4.

It is desired that this signal be produced by the apparatus of FIG. 4 only in the event that an unscheduled message, rather than a scheduled message, is transmitted by one of the send-receive stations of the associated area circuit. When scheduled messages are being sent by successive send-receive stations of an area circuit under the control of the associated APULS unit, it is desired that the EOM's not be permitted to produce a signal on the line 65, since the basic purpose of this signal is to call for an unscheduled scan. In order to avoid having the EOM's of scheduled messages actuate the unscheduled EOM recognition circuitry, the switch 62 referred to above is provided between the line 65 and the associated power source. When the associated APULS unit is conducting a scan and, by definition, permitting scheduled messages to be received by the associated low speed reperforator, the APULS unit holds the switch 62 open. Accordingly, even though the EOM recognition circuitry shown in FIG. 4 responds to the EOM of the scheduled messages and closes the switch 60, no pulse is applied to the line 65. When the associated APULS unit has completed its scheduled scan, it permits the switch 62 to close Subsequent EOM's may then produce the desired pulse on the line 65.

An "unscheduled message received" signal now having been derived, it is next desired that this signal be delayed in its function of calling for an unscheduled scan until tape is fed out from the low speed reperforator of sufficient length that the entire message is physically available to the associated high speed reader. In the case of the actual apparatus employed, the transmission of the signal on line 65 is delayed until 37 additional characters have been received.

Figure 5:
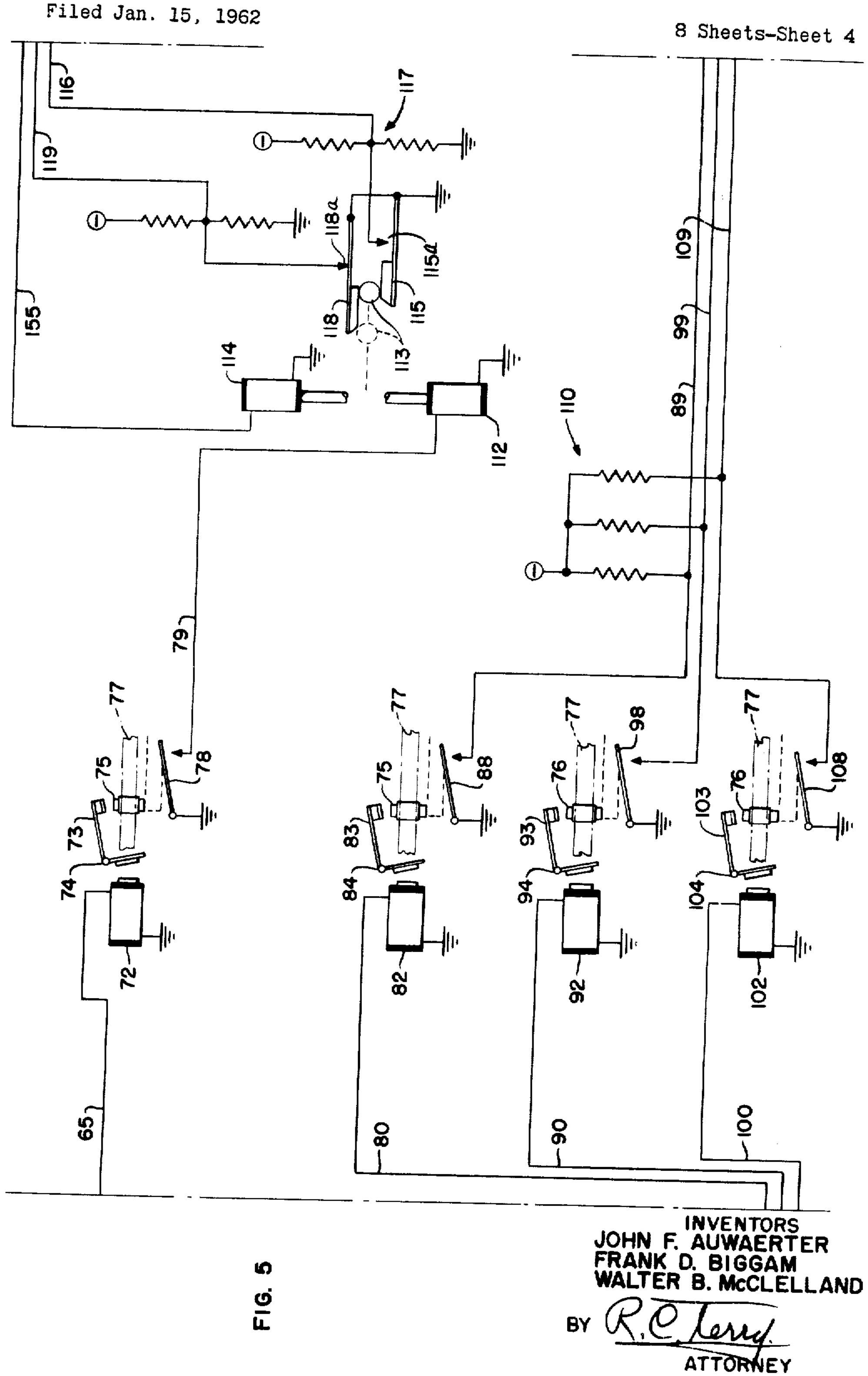
FIG. 5 is a diagram of circuitry for delaying the "message available" signals until a prescribed number of additional characters are added to the record tape such that the preceding message may be not only present on the tape but physically available to the associated record translating device, along with electrical circuitry associated with a counter for unscheduled messages.

Referring now to FIG. 5 it will be seen that the line 65 connects to an electromagnet 72. Actuation of this electromagnet pivots a bell crank 73 about its axis 74 to move one of a plurality of pins 75 downward as viewed in FIG. 5.

The pins 75 are arranged near the periphery of a wheel 77 which is indexed one step upon the reception of each character. The physical arrangement of the wheel and the pins along with associated apparatus is shown in detail in FIGS. 8–12 and is described in detail below. For the purpose of understanding the operation of the basic circuitry presently being described, it is sufficient to understand that following the setting of a pin 75 by the ball crank 73 the pin will cause the closing of a switch contact 78 after the reception of 37 additional characters has caused the wheel 77 to be indexed such that the displaced pin 75 is carried into operative engagement with the switch 78.

When the actuated pin 75 closes the switch 78 it applies a signal in the form of a ground connection to a line 79. In effect, the delay of the signal until 37 additional characters have been received, converts the signal from a "message received" signal on the line 65 to a "message available" signal on the line 79.

The same 37-character delay apparatus referred to immediately above and shown in detail in FIGS. 8–12 also serves to delay three signals which are produced by APULS and which indicate that three respective blocks of scheduled messages have been received. As indicated hereinbefore, each APULS programming unit, one of which is shown in block form in FIG. 4, scans its associated area circuit, calling upon the send-receive stations successively to send available data for reception by the associated low speed reperforator. Also as indicated hereinbefore, the send-receive stations of an area circuit are arbitrarily divided into three blocks.

The scan of block 1 stations must be completed before any of the accumulated data is indicated as being available for transmission by the associated high speed reader. More particularly, when the central high speed programming unit, identified as APUHS, calls for block 1 from a given area circuit, the high speed reader will not be actuated to send any received data unless the scan of block 1 has been completed. Similiarly no part of block 2 or of block 3 will be transmitted by the high speed reader when called for unless the scan of the requested block has been completed by the associated APULS.

Accordingly, the APULS unit is arranged to produce a signal on lines 80, 90 and 100 upon the completion of the scanning of the three blocks. More particularly, the APULS unit applies a signal to line 80 upon completion of the scanning of block 1, it applies a signal to line 90 upon completion of the scanning of block 2, and it applies a signal to line 100 upon completion of the scanning of block 3.

The three signals applied to the lines 80, 90 and 100 may be simple "on" or "off" signals, distinguishable only by virtue of their being applied to the three different leads. It should be recognized that APULS also generates multiple-character EOB signals which it applies to the low speed line of the area circuit such that they are recorded on the tape by the associated low speed reperforator as well as by all of the receiving printers on the low speed circuit.

A signal applied to the line 80 actuates an electromagnet 82 in FIG. 5 and causes a bell crank 83 to pivot about an axis 84 such that a pin 75 is moved to a position wherein it will actuate contacts 88 when the wheel 77 has been indexed 37 steps by the reception of 37 additional characters.

The pins 75 for the unscheduled messages are the same as the pins 75 for the block 1 scheduled messages. As is described in detail below in connection with FIGS. 8–12 the bell cranks 73 and 83, when actuated, are arranged to urge the pin 75 which happens to be aligned therewith in opposite directions. A pin 75 thus displaced in one direction or the other by the bell crank 73 or 83 is in a position to engage either the switch 78 or the switch 88, depending upon the direction in which it has been displaced.

When a displaced pin 75 actuates the switch 88 a ground signal is placed upon a line 89. In effect the delaying of the signal pulse until 37 additional characters have been received converts the signal from a "block No. 1 received" signal on the line 80 to a "block No. 1 available" signal on the line 89.

When APULS applies a signal to line 90, upon completion of the scanning of block 2, it actuates an electromagnet 92. This pivots a bell crank 93 about an axis 94 to displace one of a series of pins 76. Pins 76 are similar to the pins 75 but are arranged in a different peripheral row, all as is explained in detail below in connection with FIGS. 8–12. Such displacement of a pin 76 causes it to actuate a switch 98 when 37 additional characters are received by the associated low speed reperforator. This applies a ground signal to a line 99 for indicating that block 2 data is available for reading and transmission.

Finally, when the APULS unit applies a signal to the line 100 upon completion of the scanning of the block 3 stations, this actuates an electromagnet 102 which pivots a bell crank 103 about an axis 104. Such actuation of the bell crank 103 moves one of the pins 76 in the direction opposite to that in which it can be moved by the bell crank 93, again as described below in connection with FIGS. 8–12.

Such displacement of a pin 76 causes it to close a switch 108 upon receipt of 37 additional characters by the associated low speed reperforator. This applies a signal to a line 109 indicating that block 3 has not only been received but is available for reading and transmission.

As is clearly shown in FIG. 5, the lines 89, 99 and 109 are connected to a high impedance power source 110 which includes a resistor for each line. Normally the lines are thereby maintained at a voltage of −6 volts, but when a switch 88, 98, or 108 is closed the corresponding line is dropped to ground or zero voltage.

Under ordinary operating conditions an EOB1 or an EOB2 signal, as recorded, is followed promptly by characters of a succeeding block of messages. However, in the case of unscheduled messages and block 3 messages and in the event of unexpected delays, a message may not follow to advance the tape and to make the last recorded message or block available to the transmitter. Accordingly, the system preferably includes apparatus for feeding out tape by inserting "fill" characters, in the event that an EOB and EOM signal is not followed promptly by additional message characters. Such apparatus is common in the art and, therefore, is not shown in the drawings or described herein.

Returning again to the "unscheduled message available" signal appearing on the line 79 in FIG. 5, it is necessary that unscheduled messages be counted in order that all unscheduled messages available at a high speed reader may be transmitted, one after the other, when that particular high speed reader is called upon in an unscheduled scan. More specifically, a counting device, shown schematically in the upper right-hand portion of FIG. 5, is arranged to count up as unscheduled messages are received by the associated low speed reperforator and become available for reading and transmission, and to count down as these unscheduled messages are read by the high speed reader and transmitted.

This apparatus includes an electromagnet 112 which is actuatable by the "unscheduled message available" signal on the line 79. Actuation of the electromagnet 112 indexes a counting device which is shown in detail in FIGS. 13–15 and described below. For the purpose of understanding the operation of the basic circuit presently being described, it is sufficient to understand that a pin 113 seen in FIG. 5 is indexed one step to the left upon each actuation of the indexing electromagnet 112.

The counting apparatus includes a second electromagnet 114 which is similar in function to the electromagnet 112 except that it indexes the pin 113 one step to the right each time that an unscheduled message is transmitted. The electromagnet 112, therefore, actuates the pin 113 to count up unscheduled messages as they are received on the associated low speed reperforator, while the electromagnet 114 actuates the pin to count down as the accumulated unscheduled messages are transmitted by the associated high speed reader. Accordingly, the position of the pin 113 indicates the number of unscheduled messages recorded on punched tape between the associated low speed reperforator and high speed reader and thus available for transmission.

The pin 113 is shown in solid lines in FIG. 5 in its home or zero position wherein it designates that no unscheduled messages are available for transmission. When a single unscheduled message is received and becomes available the signal appearing on the line 79 causes actuation of the electromagnet 112 and movement of the pin 113 one step to the left, this position being illustrated by the phantom lines in FIG. 5.

When the pin 113 is in the phantom line position indicating that one unscheduled message is available, a cam 115 is released thereby to close contacts 115*a* whereby a ground signal is applied to a line 116, this line normally having applied thereto a −6 volt signal derived from the illustrated power source and voltage divider 117.

A second cam 118 controlling contacts 118*a* is also under the control of the pin 113. This cam is permitted to move inwardly of the path of the pin 113 and to open its contacts 118*a* when the pin 113 is advanced to a position two steps removed from its home position. Accordingly, when the pin 113 returns to its one-count position, shown in phantom lines in FIG. 5 it recloses the contacts 118*a* and applies a ground signal to a line 119, this line normally having a −6 volt signal applied thereto by the indicated power source and a voltage divider 120. The application of the ground signal to the line 119 is indicative of the fact that only a single unscheduled message remains available for transmission. The function of this signal is explained below in connection with FIGS. 6 and 7.

Figure 6:
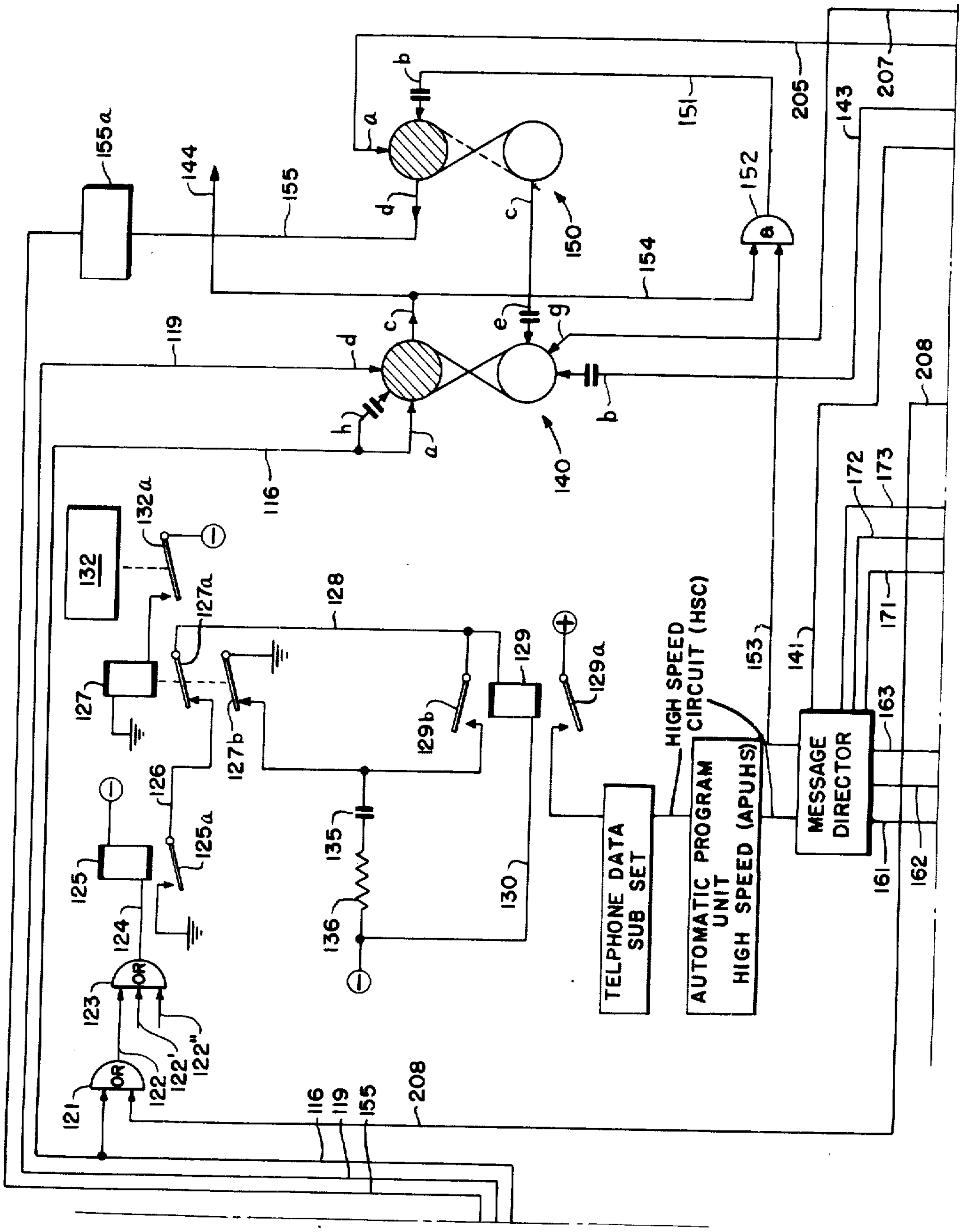
FIG. 6 is a diagram showing circuitry for initiating an unscheduled scan in response to an "unscheduled message available" signal, and for responding to resulting call signals to actuate the associated record translating device.

The ground signal on the line 116, indicating that one or more unscheduled messages are available for transmission, is applied through an "or" gate 121, whose function is explained below, to a line 122 and another "or" gate 123, all as seen in FIG. 6. The purpose of the "or" gate 123 is to permit the funneling of "unschedule message available" signals from the three low to high converters of an interchange center into a single channel. It will be appreciated by those skilled in the art that the "or" gate 123 may be comprised simply of three diodes arranged in the proper polarity such that the ground signals applied thereto by the line 122, or corresponding lines 122′ and 122″ from the other two low to high converters, may pass through the "or" gate from left to right in FIG. 6 but may not be passed back to the other input lines.

When a ground signal is applied to any of the lines 122, 122′ or 122″, this ground signal appears on a line 124 whereby a relay 125 is energized and closes its contacts 125*a*. This in turn applies a ground signal to a circuit including a line 126, normally closed contacts 127*a* of a busy line relay 127, a line 128, a relay 129 and a line 130, which is connected to a power source as indicated.

Accordingly, when an "unscheduled message available" signal is applied to the line 116, the relay 125 closes its contacts 125*a* which in turn actuates the relay 129 such that it closes its contacts 129*a* and 129*b*. Closure of the contacts 129*a* applies a positive signal to the subset of the associated interchange center which in turn applies a prolonged "space" signal to the high speed circuit. The APUHS unit responds by initiation of an unscheduled scan.

The contacts 127*a* of the busy line relay 127 are arranged in the circuit which produces the signal calling for the unscheduled scan in order that this signal may not be placed on the high speed circuit at a time when messages are being transmitted over the high speed circuit. For this purpose, the busy line relay 127 is energized and opens its contacts 127*a* whenever the high speed circuit is busy. Energization of the busy line relay 127 is effected by busy line actuation of a busy line detector 132 which closes contacts 132*a* and thereby connects the busy line relay to the indicated power source. The busy line detector 132 may be of conventional form well understood in the art and accordingly is not described herein.

It will be apparent that as soon as the "space" signal is applied to the high speed circuit in order to call for an unscheduled scan, the busy line detector will actuate the busy line relay 127 and open the circuit through which the relay 129 was originally energized. This would limit the duration of the scan request signal such that APUHS might not respond. In order to assure a scan request signal of sufficient duration, additional circuitry is provided for holding the relay 129 in its energized position for a period of one or two seconds following the interruption of the originally energized circuit for the relay 129.

This supplemental circuitry includes secondary contacts 129*b* of the relay 129 along with a capacitor 135 and a resistor 136. As soon as the relay 129 is initially energized its contacts 129*b* connect the capacitor 135 and the resistor 136 across the energized coil of the relay. When the energizing circuit for the relay 129 is interrupted by energization of the busy line relay 127, the charge stored in the capacitor 135 discharges through the resistor 136 and maintains the relay 129 energized for a period of one or two seconds. Accordingly, the relay 129 will remain energized for such a period of time that a scan requesting signal of adequate duration will be applied to the high speed circuit and directed toward the APUHS programming unit.

In order to assure that the capacitor 135 will be fully charged prior to the breaking of the original energizing circuit of the relay 129 by the busy line relay 127, this capacitor is arranged to be charged prior to the initial actuation of the relay 129. This is accomplished through secondary contacts 127*b* of the busy line relay. It will be apparent that any time that the busy line relay is deenergized (such that an unscheduled scan request signal may be generated) the contacts 127*b* will be closed whereby the capacitor may be charged by the indicated power source through the resistor 136 and the busy line relay contacts 127*b* to ground.

The APUHS programming unit responds to the two-second scanning request signal by initiating an unscheduled scan. All possible sources of an unscheduled message are scanned in accordance with a predetermined schedule, these sources including the fifteen area circuits and the 33 send-receive centers. When APUHS reaches, in its scan, a source which has an unscheduled message available, the high speed reader of that source actuated. The basic circuitry for effecting the actuation of the high speed reader for transmission of an unscheduled message is illustrated in the right-hand portion of FIG. 6.

A flip-flop circuit 140 is primed by the presence of a signal on the line 116, this line being connected to a priming terminal *a* of the flip-flop 140. The signal on the line 116 indicates that an unscheduled message is available, as described above.

When APUHS sends the call letters for the illustrated area circuit, this is detected by the message director, shown in block form in FIG. 6, which in turn applies a "request" signal to a line 141. The line 141 may be seen to extend into FIG. 7 where it passes through an "or" gate 142 to a line 143. The reason for the "or" gate is explained in connection with FIG. 7 and the distribution of scheduled messages.

The line 143 extends back to FIG. 6 where it is shown connected to a setting terminal *b* of the flip-flop 140. The pulse applied to the line 143 sets flip-flop 140 and produces a signal on an output terminal *c* of the flip-flop. A line 144 connected to the output terminal *c* carries the output signal to suitable control apparatus, not shown, which responds to the output signal to actuate the associated high speed reader. Accordingly, an unscheduled message recorded on punched tape between the associated low speed reperforator and the associated high speed reader will be read and transmitted.

In view of the circuitry thus far described if may be seen that this flip-flop 140 actuates the associated high speed reader in response to priming by an "unscheduled message available" signal on the line 116 and setting by an "unscheduled message requested" signal on the line 143.

The reader is turned off by resetting of the flip-flop 140 when the flip-flop is primed by a "next EOM" signal and reset by an actual EOM signal. The so-called next EOM signal is obtained from the previously described contacts 118*a* of the counter shown at the right in FIG. 5. More specifically, when only one unscheduled message is present on punched tape between the associated low speed reperforator and high speed reader, the pin 113 of the counter is in the position shown in phantom lines in FIG. 5 such that the contacts 118*a* are closed. This applies a ground signal to the line 119 which ordinarily has a −6 volt signal applied thereto by the indicated power source and the voltage divider 120. This ground signal is carried to FIG. 6 on the line 119 and to a priming terminal *d* of the flip-flop 140 where it primes the flip-flop for resetting.

It will be apparent to those skilled in the art that the counter of FIG. 5 might be employed to send a setting signal to the flip-flop 140 when the count therein reaches zero. However, since the counter is mechanical there might be an unacceptable delay in the derivation of such a signal. The use of the "next EOM" signal from the counter to prime the flip-flop 140 for resetting permits the use of a transmitted EOM to set the flip-flop. This results in resetting of the flip-flop with sufficient rapidity that no characters following the EOM are transmitted.

An actual EOM signal is applied to a reset terminal *e*, this signal being derived from a monostable flip-flop circuit 150. The flip-flop 150 is primed by a signal applied to a priming terminal *a* thereof. The source of this signal is the circuitry of FIG. 7 which controls the distribution of scheduled messages and accordingly it is described below. For the present, it need only be understood that the flip-flop 150 is primed at all times except when a block 3 scheduled message is being transmitted. The flip-flop 150 is set by the application of a signal to its setting terminal *b* through a line 151 and an "and" gate 152.

Each time that an EOM signal is carried on the high speed circuit the message director of FIG. 6 decodes it and produces a signal on a line 153, this being one of two lines supplying input to the "and" gate 152. It should be noted that the message director will apply a signal to the line 153 each time that an EOM signal appears on the high speed circuit regardless of whether the message is a scheduled message or an unscheduled message and regardless of the source of the message. The other line feeding the "and" gate 152 is a line 154 which is connected to the output terminal *c* of the flip-flop 140.

It may now be seen that a setting signal will be applied to the line 151 and to the setting terminal *b* of the flip-flop 150 only in the event that an EOM signal is detected on the high speed circuit during a time that the flip-flop 140 is in its set condition. The reason for limiting the actuation or setting of the flip-flop 150 to conditions other than the simple detection of any EOM signal is that a second output terminal *d* is connected through a line 155 and a relay drive circuit 155*a*, having the same purpose as relay drive circuit 59 to, the count down electromagnet 114 of the counter in FIG. 5.

The counter is intended to keep count of unscheduled messages available at the high speed reader of one area circuit. Accordingly, it is desired that the count down electromagnet 114 not be actuated upon the presence of any EOM signal on the high speed circuit other than the EOM of an unscheduled message transmitted by the associated high speed reader. Actuation of the count down electromagnet 114 of FIG. 5 as a result of setting of the flip-flop circuit 150 of FIG. 6 is therefore limited to EOM's derived from the associated high speed reader through use of the "and" gate 152 and the line 154.

Additionally, actuation of the count down solenoid 114 by the flip-flop 150 is limited to EOM's of unscheduled messages by the priming control of the flip-flop 150, transmission of scheduled messages inhibiting the operation of the flip-flop. The necessary of this inhibition is described in greater detail below following the description of the circuitry of FIG. 7. The flip-flop 150 being monostable, resets after a brief interval without external activation, in a manner well known in the art.

It has now been shown that the flip-flop 140 will produce a reader actuating signal on the line 144 when it is primed by a signal on the line 116, indicating that an unscheduled message is available, and when it is set by a signal applied to the lines 141 and 143, indicating that the APUHS unit has requested the message. It has also been shown that the flip-flop 140 will cause the reader to be deactuated when it is primed by the presence of a "next EOM" signal on the line 119 and reset by a signal on its reset terminal *e*, indicating that the EOM signal accompanying the last unscheduled message registered in the counter has been transmitted on the high speed circuit.

Still further it has been shown that the signal applied to the setting terminal *b* of the flip-flop 150 is indicative of the fact that an EOM signal has been transmitted over the high speed circuit and that the EOM signal originated through the associated high speed reader, and that the signal followed an unscheduled rather than a scheduled message. Accordingly, the counter will be caused to count down only at the proper times.

Figure 7:
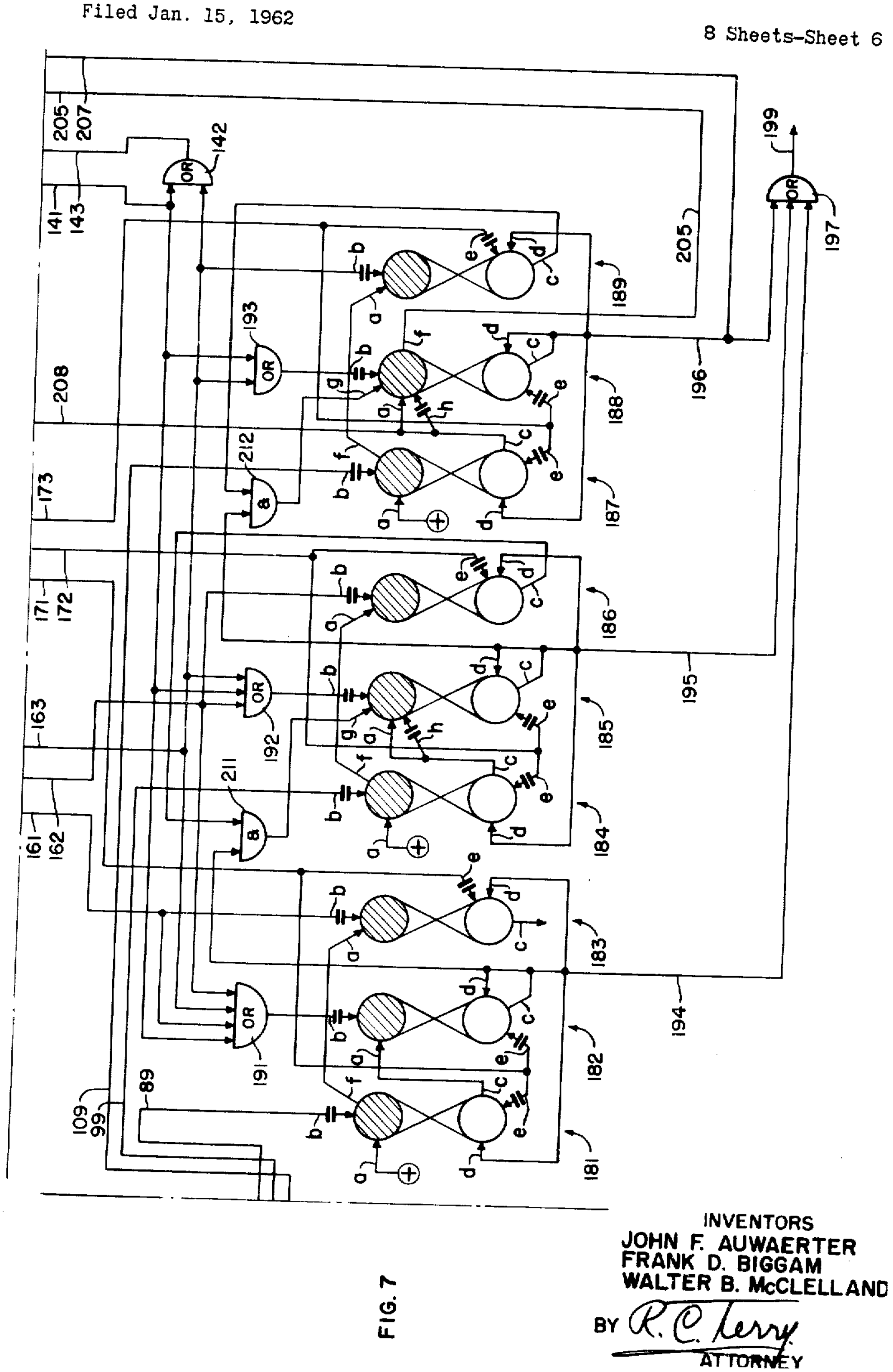
FIG. 7 is a diagram of circuitry for initiating and terminating operation of the associated record translating device under appropriate conditions relative to requests for and availability of scheduled messages.

The circuitry of FIG. 7 serves primarily to actuate the high speed reader when the APUHS unit, in a scheduled scan, requests one of the three blocks of scheduled messages, provided that the requested block, and/or any previously requested block, is available. It also serves to deactuate the associated high speed reader when an end-of-block signal is received, provided that this end-of-block signal designates the end of the requested block. Other functions of the circuitry of FIG. 7, particularly regarding the interrelation of the scheduled and unscheduled messages, are described below in connection with the description of the specific circuitry.

The lines 89, 99 and 109 entering FIG. 7 at the left carry signals indicating the availability of blocks of messages, namely blocks 1, 2 and 3, respectively. As previously indicated, these signals are originated by the APULS programming unit for the associated low speed area circuit, the APULS unit supplying these signals following the completion of its scanning the send-receive stations of the corresponding block. As explained above in connection with the description of FIG. 5, these signals are delayed for 37 characters by the apparatus of FIGS. 8–12. Accordingly, the signals appearing on lines 89, 99 and 109 indicate that blocks of messages are available, whereas signals appearing on 80, 90 and 100 indicate only that blocks of messages have been received by the associated low speed reperforator.

During the scanning by the APUHS unit of the fifteen high speed readers of the entire system, each of the three blocks of messages which may be available at any one of the fifteen high speed readers is called for in sequence. The characters which comprise the requests for the three blocks of messages are detected by the message director of FIG. 6, which in turn sends a request signal over the corresponding one of three lines 161, 162 and 163, these lines extending into FIG. 7.

When a block of messages has been read out by the high speed reader of an area circuit it reads out the EOB which was inserted on the tape by the corresponding APULS unit. This EOB is detected by the message director of FIG. 6 as indicating the end of block 1, block 2 or block 3 and it applies a signal indicative thereof to the appropriate one of three leads 171, 172 or 173, these leads extending into FIG. 7.

The principal elements of the circuitry of FIG. 7 are nine flip-flop circuits designated 181–189. The first three are associated primarily with the first block, the second three with the second block, and the last three with the third block.

When a signal appears on the line 89 indicating that block 1 messages are available to the high speed reader, it is applied to terminal *b* of the flip-flop 181 and sets the flip-flop 181 since it is continuously primed by the illustrated power source connected to terminal *a*. This produces an output on terminal *c* which is connected to terminal *a* of the associated flip-flop 182 to prime that circuit for setting.

It will be noted that "block available" signals on the lines 99 and 109 similarly set flip-flops 184 and 187, respectively, such that they prime their associated flip-flops 185 and 188. When any one of the three groups of three flip-flops thus has its second flip-flop circuit primed by the reception of a "block available" signal, the group is ready to be actuated by reception of a "block requested" signal.

When APUHS requests the first block of messages of any given area circuit, the message director at the corresponding interchange center recognizes not only that a block of messages is requested from a particular one of the three area circuits that it serves, but also the particular one of the three blocks which is requested. If APUHS calls for the first block of messages from the high speed reader which the circuitry of FIG. 7 controls, a signal appears on the line 161 and passes through an "or" gate 191 to the setting terminal *b* of the flip-flop 182. This produces an output on terminal *c* of flip-flop 182 if primed by the flip-flop 181.

Similarly, if the signal appears on line 162, indicating a request for the block 2 messages, this signal is passed to an "or" gate 192 and to the set terminal *b* of the flip-flop 185. This produces an output on terminal *c* of flip-flop 185 if primed. Finally, if a block request signal is applied to line 163, this signal is passed to an "or" gate 193 and setting terminal *b* of the flip-flop 188. This produces an output on terminal *c* of this flip-flop if primed.

The output signals from the *c* terminals of the flip-flops 182, 185 and 188 are carried by conductors 194, 195 and 196 to an "or" gate 197, whereby a signal on any one of these three lines produces a signal on a line 199. A signal on the line 199 actuates conventional control circuitry to initiate operation of the associated high speed reader. The line 199 may be common with the line 144 of FIG. 6.

The output terminal *c* of the second flip-flop of each group (namely flip-flops 182, 185 and 188) in addition to being connected to the "or" gate 197 is connected to a reset priming terminal *d* of the same flip-flop and to a reset priming terminal *d* of the two associated flip-flops.

When the high speed reader completes the transmission of a block of scheduled messages and reads the EOB signal on to the high speed circuit, the message director recognizes the number of the block which has been transmitted and applies a signal to the corresponding one of the lines 171, 172 and 173. A signal thus appearing on the line 171 is applied to setting terminals *e* of the two flip-flops 181 and 182 thereby causing them to be reset.

Similarly, if it is the second block of messages being transmitted, the EOB is recognized by the message director as being of the second block and the director applies a signal to the line 172 and to the reset terminals *e* of the flip-flops 184 and 185 to reset both of these flip-flops. Finally, if the EOB signal indicates the end of a third block of messages, the EOB signal is applied by the message director to the line 173 and to the reset terminals *e* of the flip-flops 187 and 188.

It should be appreciated that for the entire system (for all fifteen area circuits), there need be only three distinguishable EOB signals, these being characteristic of end of block 1, end of block 2, and end of block 3. More particularly, there is no need to distinguish between EOB1 for any given area circuit as opposed to EOB1 for another area circuit. When an EOB1 signal is passed over the high speed circuit all message directors will respond by placing an EOB signal on its corresponding line 171. In the case of the one area circuit which is in fact transmitting, the flip-flops 181 and 182 thereof will be reset. In the case of the other fourteen area circuits, the corresponding message directors will place the EOB signals on their respective line 171 and will attempt to reset the corresponding flip-flops 181 and 182. Since those flip-flops, in the case of the fourteen nontransmitting area circuits, are already in their zero or reset condition, the reset signal applied to the reset terminal *e* will have no effect.

When the flip-flop 188 is thus reset a signal appears on its output terminal *f*. This signal is applied to a line 205 which passes to FIG. 6 and connects to the priming terminal *a* of the flip-flop 150. It will be recalled that this primes the flip-flop 150 in the manner discussed above in connection with the description of FIG. 6, to cause it to be primed at all times other than when block No. 3 data is being transmitted.

In the event that block 1 messages should become available after the block 1 messages have been requested, and if block 2 messages are not yet available when the block 2 messages are requested, it is desirable that the block 2 request cause initiation of operation of the high speed reader in order that the block 1 messages may be read out. In order that this may be accomplished, the block 2 request signal appearing on line 162 is directed not only to the setting terminal *b* of the flip-flop 185 through the "or" gate 192 but also to the setting terminal *b* of the flip-flop 182 through the "or" gate 191. This, of course, accounts for the use of the "or" gate 191.

Similarly, in the event that the block 1 messages become available subsequent to both the block 1 request and the block 2 request, and/or in the event that the block 2 messages become available subsequent to the block 2 request, in combination with the receipt of the block 3 request prior to the availability of the block 3 messages, it is desired that the block 3 request initiate operation of the corresponding high speed reader in order that it may read out the block 1 messages and/or the block 2 messages. In order to accomplish this, the block 3 request signal appearing on line 163 is directed not only to the set terminal *b* of the flip-flop 188 through the "or" gate 193 but also through the "or" gate 192 to the setting terminal *b* of the flip-flop 185 and through the "or" gate 191 to the setting terminal *b* of the flip-flop 182.

Finally, in the event that any scheduled messages remain untransmitted and available when a signal is applied to the line 141 of FIG. 6 indicating a request for unscheduled messages and if there is no unscheduled message available, it is desired that the high speed reader be actuated to read out the late, scheduled messages.

In order to accomplish this, the "unscheduled message request" signal is directed not only to the flip-flop 140 of FIG. 6 through the "or" gate 142 at the upper right-hand corner of FIG. 7 but also to the setting terminal *b* of the flip-flop 188 through the "or" gate 193, to the setting terminal *b* of the flip-flop 185 through the "or" gate 192 and to the setting terminal *b* of the flip-flop 182 through the "or" gate 191.

Further provision is made in the illustrated circuitry to provide for the transmission of a late block of messages in the event that that block of messages becomes available while the high speed reader is transmitting a preceding, late block of messages. More specifically, if the first block of messages becomes available subsequent to the request for block 1 messages, but before the request for the block 2 messages, and the block 2 messages are not available at the time of the request for the block 2 messages but become available prior to the completion of the transmission of the block 1 messages in response to the request for the block 2 messages, it is desirable that the reader continue operation following the completion of the transmission of the block 1 messages in order that the block 2 messages may be transmitted without waiting for the request for the block 3 messages.

In order that this may be accomplished, the signal on the line 162 from the message director indicating the request for block 2 messages is applied not only to the setting contact *b* of the flip-flop 185 through the "or" gate 192 (this being ineffective since the flip-flop has not been primed by availability of the block 2 messages) but also to a setting terminal *b* of the third flip-flop 186 of the second group. With the first flip-flop 184 of the second group in its zero or reset condition (block 2 messages not being available), a signal on an output terminal *f* of the flip-flop 184 is carried to a priming terminal *a* of the flip-flop 186. It will be remembered that the flip-flop 184, when set, primes the flip-flop 185 for setting, whereby, when the request for block 2 messages appears on the line 162, it always sets either the flip-flop 185 or the flip-flop 186.

When the block 2 messages are not available, the third flip-flop 186 becomes set in response to the request for block 2 messages. An output terminal *c*, which is energized by the setting of the flip-flop 186, is connected through an "and" gate 211 to another set priming terminal *g* of the flip-flop 185. In the event that the block 2 request signal on line 162 initiates operation of the high speed reader to read out late block 1 messages, by operation of the flip-flop 182 through the "or" gate 191, the output signal on the output terminal *c* of the flip-flop 182 is applied to the "and" gate 211 such that a priming signal is applied to the *g* terminal of the flip-flop 185. This priming signal remains in effect throughout the reading of the block 1 messages.

If the block 2 messages should become available during this interval, the resulting signal, appearing on line 99, sets the flip-flop 184, and the signal thus produced on the output terminal *c* of the flip-flop 184 is applied not only to the previously mentioned priming terminal *a* of the flip-flop 185 but also to a set terminal *h* thereof. Accordingly, when the block 2 messages become available, the flip-flop 185 becomes set.

When the high speed reader subsequently reads the end of block 1 signal off the punched tape and applies this signal to the high speed circuit, the resulting application of a signal by the message director to the line 171 resets the flip-flops 181 and 182 in the manner previously described, but it has no effect upon the flip-flop 185. The output of the set flip-flop 185 continues actuation of the high speed reader through the line 195 and the "or" gate 197. The block 2 messages thereby are transmitted immediately after transmission of the block 1 messages.

It will be appreciated that the block 2 request signal appearing on line 162 is of momentary nature. More specifically, it will not remain effective to set the flip-flop 185 until such time as block 2 messages may become available during the transmission of late block 1 messages. However, the setting of the flip-flop 186 by the block 2 request signal provides a continuing signal applied to the "and" gate 211, and the output signal of the set flip-flop 182 provides a continuing signal on the "and" gate 211 such that a continuing prime signal is applied to the terminal *g* of the flip-flop 185. Accordingly, if block 2 messages become available during the reading of the late block 1 messages the setting of the flip-flop 184 may result in the setting of flip-flop 185.

Similar cooperation is provided between the block 2 circuitry and the block 3 circuitry. Let it be assumed that the signal requesting block 3 messages is applied to the lead 163 by the message director at a time when block 3 messages are not available but block 2 messages are available, they having become available subsequent to the request for block 2 messages. The signal appearing on line 163 will have no effect upon the setting terminal *b* of the flip-flop 188 since this flip-flop is not primed, block 3 not yet being available. However, the signal on line 163 is also applied to setting terminal *b* of the flip-flop 189. This will be effective to set the flip-flop 189 since terminal *a* thereof is primed by a signal from the reset output terminal *f* of the flip-flop 187.

Setting of the flip-flop 189 produces a signal on an output terminal *c* which is connected to an "and" gate 212. Also connected to this "and" gate is the output terminal *c* of the flip-flop 185 of the block 2 group. When the output of the set flip-flop 189 (indicating block 3 requested and block 3 not available) and the output of the set flip-flop 185 (indicating block 2 being transmitted) are both applied to the "and" gate 212, a priming signal is applied to a priming terminal *g* of the flip-flop 188.

If during the transmission of block 2, block 3 becomes available, the flip-flop 187 will be set, and the output appearing on its terminal *c* will set the flip-flop 188 through a setting terminal *h*. Accordingly, the subsequent transmission of an "end of block 2" signal by the high speed reader will reset the flip-flop 185, but the flip-flop 188 will remain set and will cause continued operation of the high speed reader until the "end of block 3" message is transmitted.

It should be noted that upon receipt of the block 2 request, if neither block 2 nor block 1 is available, the flip-flop 186 will nevertheless be set and remain set. If block 1 only should become available prior to the block 3 request, the block 3 request appearing on line 163 will actuate the flip-flop 182 through the "or" gate 191. The resulting signal appearing on the output terminal *c* of flip-flop 182 is then applied to the "and" gate 211 in conjunction with the long standing signal applied thereto by the flip-flop 186. This applies a continuing prime on the terminal *g* of the flip-flop 185. If block 2 should become available prior to the completion of transmission of block 1, the setting of the flip-flop 184 will cause setting of the primed flip-flop 185.

Accordingly, block 2 may be transmitted immediately following block 1 even though it becomes available subsequent to receipt of the request which initiated transmission of block 1. This sequence may now be seen to follow not only a request for block 2 but also a request for block 3, the flip-flop 186 having previously been set by an unsuccessful request for block 2.

Still further, when block 2 is thus transmitted immediately following block 1, in response to the block 3 request, if block 3 should become available prior to the completion of transmission of block 2, the flip-flop 188 will be set. This follows from the fact that the flip-flop 188 will be primed by the setting of the flip-flop 189 in response to the block 3 request and by the setting of the flip-flop 185, each of the latter sending a signal through the "and" gate 212. The flip-flop 188 will then be set by operation of the flip-flop 187 in response to availability of block 3. In the illustrated embodiment of the invention this latter sequence is theoretically impossible since the reader apparatus operates at eight or ten times the speed of the associated reperforator. The circuitry nevertheless is effective, and would be of practical use where the messages are of widely disparate lengths or the speeds of operation of the reperforator and the reader are more nearly equal.

The third flip-flop of each group, namely the flip-flops 183, 186 and 189 are primed for resetting in the same manner as are the first and second flip-flop of each group. More particularly, they are primed by the signal on the output terminal *c* of the second flip-flop of the associated group, this terminal in each case being connected to a reset prime terminal *d* of the third flip-flop. A reset terminal *e* of each of the third flip-flops is connected to the corresponding lead 171, 172 or 173, whereby the third flip-flop of any one group is reset when the corresponding end-of-block signal appears on the high speed circuit, and the message director applies a pulse to the corresponding line 171, 172 or 173.

The third flip-flop of each of the three groups may be employed to actuate visual or audible signals when they are set, since the setting of one of these flip-flops indicates that a block of messages was not available when requested. Such an alarm signal may be of conventional form and is not shown or described in detail herein. It will be noted that this is the only function of the third flip-flop 183 of the first group, since this group corresponds to the block which is first in sequence.

Additional relationships are provided between the circuitry of FIGS. 6 and 7, the former being concerned primarily with unscheduled messages and the latter primarily with scheduled messages. When a signal appears on the line 141 of FIG. 6, indicating a request for unscheduled messages, this is carried to FIG. 7 where it may be seen to be applied to the setting terminals *b* of the flip-flops 182, 185 and 188 through the "or" gates 191, 192 and 193, respectively. In this manner, regardless of the cause of the unscheduled scan, if there are one or more blocks of scheduled messages which arrived too late to be read and transmitted in response to the request for block 3 messages, the request for unscheduled messages causes the transmission of the late scheduled messages even though there may be no unscheduled message to be transmitted from the given area circuit and high speed reader.

In the event that an unscheduled request on line 141 thus actuates the high speed reader to transmit late scheduled blocks of messages, and assuming that there is presently no unscheduled message to be transmitted by the associated high speed reader, provision is made for continuing actuation of the high speed reader to transmit any unscheduled message which may become available to the high speed reader prior to the completion of the transmission of the block 3 messages. In order to accomplish this, the output terminal *c* of the flip-flop 188 is connected not only through the line 196 and the "or" gate 197 to actuate the reader, but also through a line 207 to FIG. 6 and to a priming terminal *g* of the flip-flop 140. As long as the flip-flop 188 is in set condition for the transmission of block 3 messages, the flip-flop 140 will remain primed. In the event that an unscheduled message should become available during this period a signal will occur on the line 116 in FIG. 6 and will be applied therethrough to a set terminal *h* of the flip-flop 140. This will cause setting of the flip-flop 140. Accordingly, when the high speed reader reads out the EOB-3 message onto the high speed circuit the associated message director of FIG. 6 will apply a signal to the line 173 to reset all three flip-flops 187, 188 and 189 of the block 3 group, but the flip-flop 140 of FIG. 6 will remain set until the EOM of the last unscheduled message available to the reader has been sent.

In the event that block 3 messages should become available subsequent to the request for block 3 messages by APUHS, they can be applied to the high speed circuit for distribution only by way of an unscheduled scan. Accordingly, it is desirable that the availability of block 3 messages call for an unscheduled scan.

This is accomplished by connection of the output terminal *c* of the flip-flop 187 in FIG. 7 through a line 208 to FIG. 6 and to the "or" gate 121 previously referred to. Accordingly, whenever the flip-flop 187 is set, thereby indicating availability of block 3 messages, a signal will be applied through the line 208 and the "or" gate 121 to request that APUHS initiate an unscheduled scan. When the scheduled scan of the third block of scheduled messages from the fifteen area circuits has been completed by APUHS, and the high speed circuit becomes momentarily idle, the request for an unscheduled scan becomes effective.

As previously indicated, a request of APUHS for unscheduled messages produces a signal on the line 141 extending from the message director in FIG. 6 through the "or" gates 191, 192 and 193 in FIG. 7 and to the setting terminals *b* of the three flip-flops 182, 185 and 188. Accordingly, the high speed reader will become actuated and will continue until the EOB3 signal appearing on the high speed circuit is recognized by the message director such that a signal is applied thereby to the line 173 to reset the flip-flop 188.

It should be noted that the flip-flop 140 of FIG. 6 is not set by the block 3 available signal appearing on the line 208. This follows from the fact that the priming terminal *a* of the flip-flop 140 is connected to the line 116 at the left of the "or" gate 121. Accordingly, the "block 3 available" signal on the line 208 is effective to request APUHS to initiate the unscheduled scan but is not effective in priming the flip-flop 140.

Referring now to FIGS. 8–12, there is shown there the apparatus which is employed for delaying the "message received" signals, which appear on lines 65, 80, 90 and 100 at the left of FIG. 5 until 37 additional characters have been received such that the messages are physically available to the associated high speed reader. In these figures the principal functional parts of the apparatus are given the same reference numerals as are employed in FIG. 5 where the apparatus is represented schematically.

Figure 10:
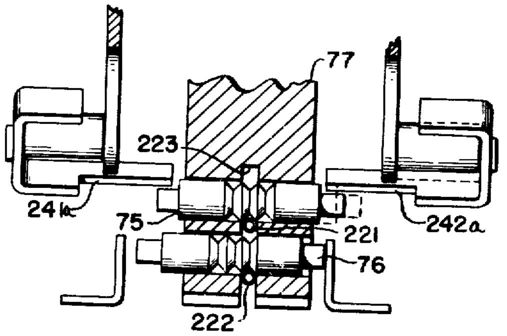
FIG. 10 is a partial, enlarged cross sectional view taken along the line 10—10 of FIG. 8.
Figure 11:
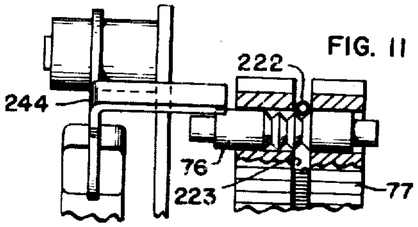
FIG. 11 is a partial, enlarged cross sectional view taken along the line 11—11 of FIG. 8.

The wheel 77 is seen in all of the FIGS. 8–12, and may be seen best in FIG. 10 as having two radially displaced rows of pins 75 and 76 extending therethrough. In FIG. 10 there may also be seen springs 221 and 222 within a circumferential groove 223 in the wheel. These springs are received within annular grooves or notches in the corresponding pins such that the springs serve as detents. More specifically, the spring 221 resiliently holds all of the pins 75 in any of three positions, namely a central position and two opposed displaced positions. The spring 222 serves a similar function with respect to all of the pins 76. In FIG. 10 it will be noted that the illustrated pin 75 is resiliently retained in its central position by the spring 221, whereas the illustrated pin 76 is resiliently retained in its leftward displaced position by the spring 222.

Figure 8:
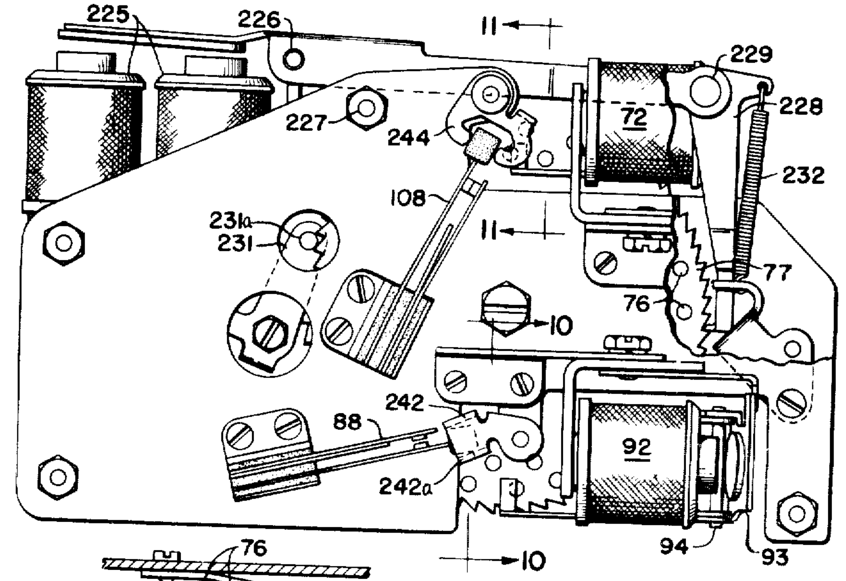
FIG. 8 is a side elevational view of delay apparatus shown in diagrammatic form in the left-hand portion of FIG. 5.
Figures 9, 12:
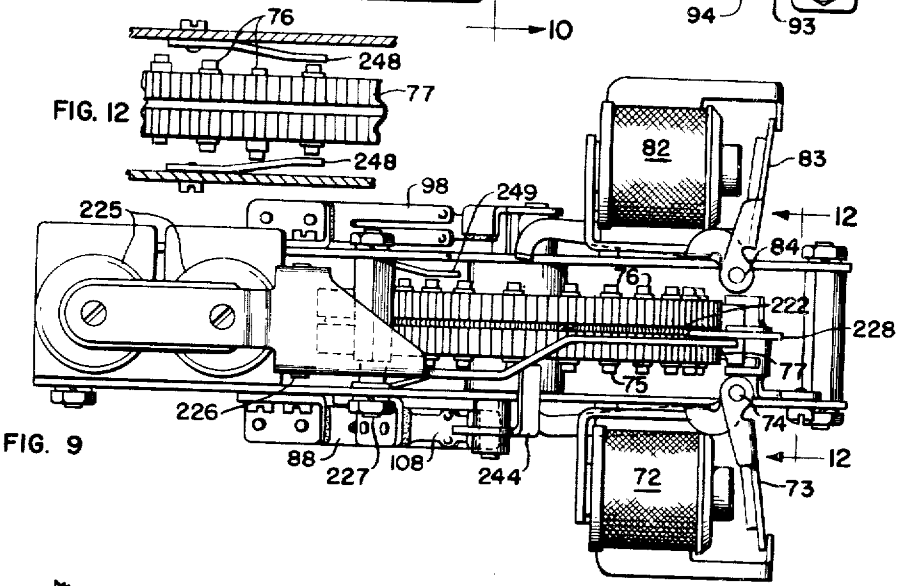
FIG. 9 is a top plan view of the same delay apparatus.
FIG. 12 is a partial, enlarged cross sectional view taken along a line 12—12 of FIG. 9.

The solenoids 72, 82, 92 and 102, referred to in connection with FIG. 5, may be seen in FIGS. 8 and 9, with the exception that the solenoid 102 is behind the solenoid 92 in FIG. 8 and is beneath the solenoid 82 in FIG. 9.

The bell cranks 73 and 83 referred to in connection with FIG. 5 are best seen in FIG. 9. It will be apparent that energization of the relay 82 for example will draw one arm of the bell crank 83 to the left in FIG. 9. The bell crank will pivot about the pin 84 such that its leftwardly extending arm will bear against a pin 75 and force it downwardly as viewed in FIG. 9, or to the right as viewed in FIG. 10. This serves to store the information that block 1 messages have been received, the solenoid 82 having been actuated by APULS upon completion of the block 1 scan of its low speed area circuit. Similarly, the solenoid 72 may actuate the bell crank 73 to urge a pin 75 upwardly as viewed in FIG. 9 or to the left as viewed in FIG. 10. The bell cranks 93 and 103 referred to in connection with FIG. 5 are not shown in detail in FIGS. 8–12, although a portion of the bell crank 93 may be seen in FIG. 8.

The wheel 77 is indexed in a clockwise direction as viewed in FIG. 8 through energization of solenoids 225. These solenoids are arranged to be actuated once upon each reception of a character by the associated low speed reperforator, in a manner well known in the art.

Each energization of the solenoids 225 pivots a lever 226 about an axis 227 such that its free end draws a pawl 228 upwardly, the pawl 228 being pivotally connected to the free end of the lever 26 through a pin 229. The pawl 228 cooperates with ratchet teeth on the periphery of the wheel 77, clearly shown in the drawings. A spring biased detent 231, having a tooth-engaging pin **231*a*, is shown in FIG. 8 for resisting rotation of the wheel 77**, particularly in the counterclockwise direction.

When the pawl 228 is raised by the lever 26 in response to energization of the solenoids 225, the free end of the pawl rides over one ratchet tooth of the wheel 77, the detent 231 maintaining the wheel stationary. The pawl 228 is urged in a clockwise direction about the pin 229 by a spring 232 such that when the solenoids 225 are deenergized the free end of the pawl engages the steep front of a ratchet tooth on the wheel 77. The spring 232 in addition to rocking the pawl 228 into engagement with the ratchet teeth also serves to pivot the lever 226 in a clockwise direction and to move the pawl downward such that the wheel 77 is indexed one step in the clockwise direction.

As successive characters are received by the associated low speed reperforator, a pin 75 or 76 which has been displaced to the left or to the right by energization of one of the solenoids 72, 82, 92 or 102 is carried about the axis of the wheel 77. When 37 additional characters have been received following the setting of a pin 75 or 76, the displaced pin closes an associated switch 78, 88, 98 or 108. The structure through which this is accomplished is described below in connection with the solenoid 82, the bell crank 83, a pin 75, and the switch 82.

Energization of the relay 82 rocks the bell crank 83 such that a pin 75 is moved downwardly in FIG. 9 or to the right in FIG. 10. Following the reception of 36 additional characters by the associated low speed reperforator, the displaced pin 75 reaches its lowermost position. Lying in the path of the pin 75 is an arm 242a of a rocker 242 which controls the switch 88, all as best seen in FIG. 8. Similar rockers 241, 243 and 244 are provided in association with the switches 78, 98 and 108, respectively.

Upon receipt of the 37th additional character, the displaced pin 75 engages the arm 242a and rocks the rocker 242 such that the switch 88 is closed. This places a signal on the line 89 of FIG. 5 which is indicative of the fact that block 1 messages are not only received but available.

Upon reference to FIG. 10 it may be seen that only the large diameter portion of a displaced pin 75 (see phantom line shown in FIG. 10) may engage the arm of an associated rocker 241 or 242. When the pin 75 is in its normal position (see solid lines of FIG. 10) the pin may pass by the arms of the associated rockers without striking either of them since the smaller diameter tips of the pin will pass under the rockers.

It will be appreciated that the rockers for controlling the switches 98 and 108, arranged near the top of the illustrated apparatus, have arms lying in the path of the pins 76, which are in turn displaceable by the solenoids 92 and 102. One rocker 244 is seen associated with the switch 108 in FIG. 8.

When a displaced pin has passed by its associated rockers and before it reaches a position wherein it may again be set by one of its associated bell cranks, it is cammed back to its neutral position. In FIG. 12, fixed cams 248, are shown for camming back the outer pins 76 which may have been displaced by the bell cranks 93 or 103. In the central portion of FIG. 9 cams 249 may be seen, in part, for camming displaced pins 75 back to their central positions.

Figure 13:
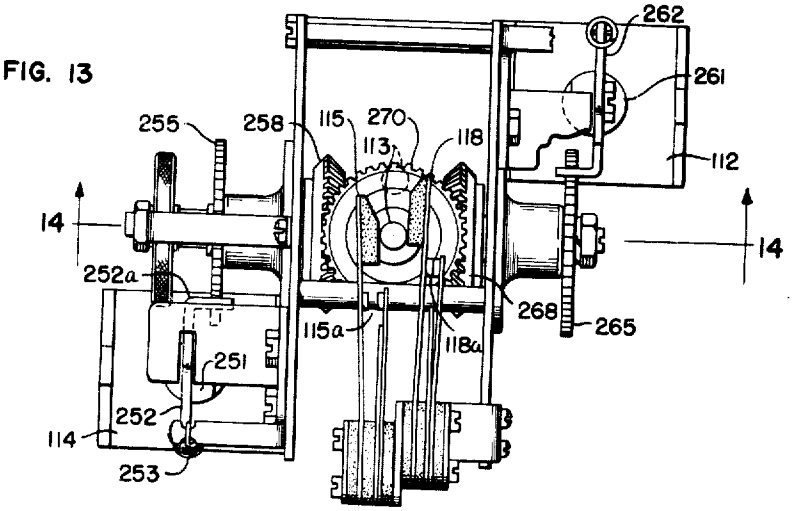
FIG. 13 is a top plan view of apparatus for counting unscheduled messages, this apparatus being shown in diagrammatic form in the right-hand portion of FIG. 5.
Figures 14, 15:
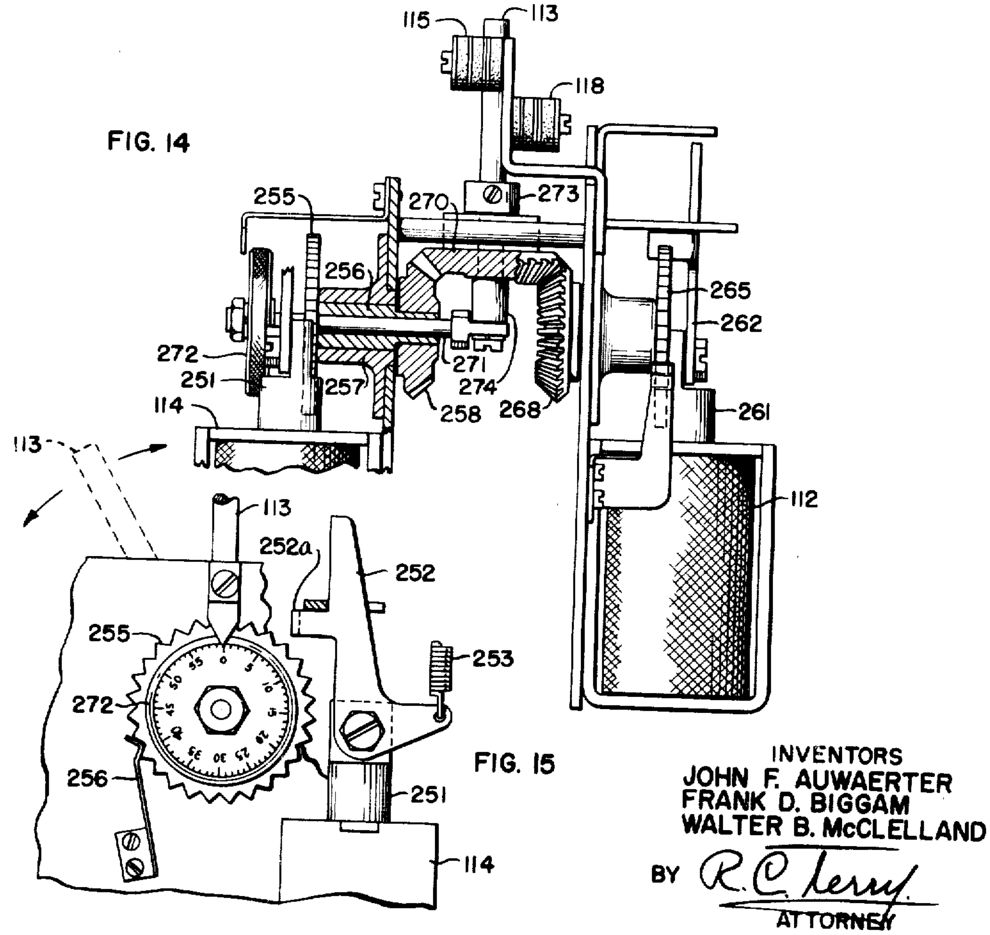
FIG. 14 is a cross sectional view taken along the line 14—14 of FIG. 13.
FIG. 15 is a partial side elevational view of the counter of FIGS. 13 and 14 as viewed from the left of FIG. 14; and, FIG. 16 is a diagram showing the proper arrangement of FIGS. 4, 5, 6 and 7 with respect to each other to form a single circuit diagram.

Referring now to FIGS. 13–15, there is shown particular apparatus for counting unscheduled messages, this apparatus being shown schematically in the right-hand portion of FIG. 5. The count up solenoid 112 of FIG. 5 is clearly shown in FIGS. 13 and 14 while the count down solenoid 114 appears in FIGS. 13, 14 and 15.

The plunger 251 of the solenoid 114 has a pawl 252 pivotally connected thereto, the upper portion of the pawl 252 riding in a suitable slot in the frame of the apparatus as indicated in FIG. 15. A spring 253 urges the pawl 252 against the closed end of the slot and urges the pawl and the associated plunger toward an elevated position determined by the engagement of an arm 252a with the frame of the apparatus.

When the count down solenoid 114 is energized it draws the plunger 251 and pawl 252 downward against the action of the spring 253. The pawl arm 252a engages a tooth of a ratchet wheel 255 and advances the wheel circumferentially by the amount of one tooth. As is shown best in FIG. 13, the free end of the pawl arm 252a is bent laterally to assure proper engagement of the arm and the ratchet wheel. A spring detent 256 is provided for assuring accurate orientation of the ratchet wheel 255 and to resist reverse rotation thereof. The wheel 255 is secured to a sleeve 256 which is mounted within a bearing 257 and carries at its inner end a bevel gear 258. Since both the bevel gear 258 and the ratchet wheel 255 are secured to the sleeve 256, these two parts are caused to rotate in unison.

Similar apparatus is provided in association with the count up solenoid 112. More specifically a plunger 261 carries a pawl 262 which cooperates with a ratchet wheel 265. The ratchet wheel is mounted on a sleeve along with a bevel gear 268.

A differential gear 270 is rotatably supported on the pin 113 which is referred to above in connection with FIG. 5. The inner end of the pin 113 is secured to a shaft 271 which extends through the sleeve 256 and is rotatably supported thereby, the outer end of the shaft 271 terminating in a counter wheel 272. The differential gear 270 is prevented from movement along the length of the pin 113 by a collar 273 and an enlarged portion 274 of the pin 113.

It will now be apparent that when the count up solenoid 112 is operated and indexes the ratchet wheel 265 and the bevel gear 268 in a counterclockwise direction as viewed in FIG. 15, the differential gear 270 will roll in a direction to swing the pin 113 in a counterclockwise direction, again as viewed in FIG. 15. When the count down solenoid 114 is actuated and indexes the ratchet wheel 265 and the bevel gear 258 in a clockwise direction as viewed in FIG. 15, the differential gear 270 will be caused to roll in a direction to swing the pin 113 in a clockwise direction as viewed in FIG. 15. Since the solenoid 112 is operated each time that an unscheduled message becomes available, and the solenoid 114 is operated each time an unscheduled message is read and transmitted, the position of the pin 113 is indicative of the number of unscheduled messages received and not transmitted.

The zero position of the pin 113 is that illustrated by the solid lines in FIGS. 13–16. Referring particularly to FIG. 13 it may be seen that in this position it forces both of the cams 115 and 118 outwardly such that the switch 115a is opened and the switch 118a is closed. Advancement of the pin 113 one step to the phantom line position of FIG. 13 permits the cam 115 to move inwardly and close its contacts 115a while the cam 118 is maintained in its outward position. Advancement of the pin 113 to its next position releases the cam 118 such that its contacts 118a open.

Apparatus has now been disclosed through which the various objects of the invention are attained. Through the illustrated apparatus the high speed readers may be actuated in response to signals requesting specific blocks of messages only if the requested block or an earlier requested block has been recorded by the associated recording device and is available to the reader or translating device. The translating device is deactuated only upon completion of the transmission of all blocks which are both requested and available.

Within the preceding portion of this specification groups of scheduled messages have been referred to as blocks while unscheduled messages have been referred to as messages. This has been done in the interest of clarity in the description of the preferred embodiment of the invention, and follows logically from the fact that the scheduled messages do come in blocks. It will be appreciated, however, that a block may include only a single message, scheduled or unscheduled, and where the term "block" is employed hereinafter it is to be given this broad interpretation.

The invention has been described in connection with an embodiment thereof which employs punched tape as a recording or storage medium. It will be appreciated that various media may be employed within the spirit of the invention, and where the term "tape" is employed hereinafter it is to be construed as including any form of storage medium having the characteristic that the data stored thereon must be inherently translated in the same sequence in which it was recorded.

While a system has been described wherein messages are handled in three scheduled blocks plus unscheduled messages, the invention is applicable in many of its aspects to a system in which blocks of messages are divided into only two groups, or are all of one kind.

While one embodiment of the invention has been disclosed many modifications will be apparent, and it is intended that the invention be interpreted as including all modification which fall within the true spirit and scope of the invention.

What is claimed is:

1. In a communication system for relaying messages grouped into distinguishable, sequentially received blocks,
- a recording device for recording intelligence signals embodying said messages;
- a transmitter for re-transmitting intelligence signals recorded by said recording device;
- switch means individually allocated to blocks of different sequential identity and actuatable to initiate operation of said transmitter;
- registering means operatively connected one each to said switch means for selectively registering the completion of the recording of the respective blocks by the recording device and for conditioning the corresponding switch means for actuation;
- means operatively connected one each to said switch means and selectively responsive to control signals requesting the respective blocks to actuate the corresponding switch means, if conditioned by said registering means, such that a control signal requesting a block initiates operation of the transmitter to retransmit the requested block if available; and
- means connected one each to said switch means and selectively conditionable by the completion of the retransmission of the respective blocks to deactuate the corresponding switch means such that the transmitter after re-transmitting the requested block is caused to discontinue operation, whereby an available later-in-sequence block will not be re-transmitted.

2. Apparatus according to claim 1 wherein each of said signal responsive means is also operatively connected to any of said switch means corresponding to a prior-in-sequence block such that a control signal requesting a block causes actuation of the transmitter to re-transmit any available prior-in-sequence block whether or not the requested block is available.

3. Apparatus according to claim 1 wherein each of said signal responsive means is also operatively connected to any of said switch means corresponding to a prior-in-sequence block such that a control signal requesting a block causes actuation of the transmitter to re-transmit any available prior-in-sequence block whether or not the requested block is available,
- wherein means, associated one each with certain of said switch means, register a control signal requesting the corresponding block, when occurring in advance of the conditioning of the corresponding switch means by said first-mentioned registering means, and condition the corresponding switch means for actuation in response to a subsequently occurring normal conditioning by said first-mentioned registering means,
- and wherein means controlled by the switch means corresponding to the next prior-in-sequence block preclude such conditioning by the second-mentioned registering means except when the next prior-in-sequence switch means is actuated.

4. Apparatus according to claim 1 wherein said recording device records intelligence signals on tape,
- and wherein means associated with said registering means delay the conditioning of the switch means until a prescribed number of additional code signals are recorded following a block such that the block becomes physically available to the transmitter, said delay means including:
- a rotary member,
- a plurality of elements supported on said rotary member equidistant from the axis thereof, each of said elements have a neutral position on said rotary member and being movable therefrom to either of two actuated positions,
- means for indexing said rotary member in response to the recording of code signals by said recording device,
- a first actuating member disposed to have operative relationship with successive ones of said elements and responsive to the completion of the recording of a block of one sequential identity to move to one of its actuated positions the element then indexed into operative relationship with the actuating member,
- a second actuating member also disposed to have operative relationship with successive ones of said elements and responsive to the completion of the recording of a block of a different sequential identity to move to the other one of its actuated positions the element then indexed into operative relationship with said second actuating member,
- first and second switch-means-conditioning devices positioned relative to the actuating members to be alternatively operable by an actuated one of said elements in accordance with its actuated position upon indexing of the rotary member incident to the recording of the prescribed number of additional code signals following actuation of the element by the corresponding actuating member.

5. In a communication system,
- a recording device for recording on tape code signals grouped into distinguishable, sequentially received blocks;
- a transmitter for re-transmitting code signals recorded by the recording device;
- and means for distinctively indicating the recording of either of two distinguishable blocks and of a prescribed number of additional code signals such that the block becomes physically available to the transmitter, said indicating means including:
- a rotary member,
- a plurality of elements supported on said rotary member equidistant from the axis thereof, each of said elements have a neutral position on said rotary member and being movable therefrom to either of two actuated positions,
- means for indexing said rotary member in response to the recording of code signals by said recording device,
- a first actuating member disposed to have operative relationship with successive ones of said elements and responsive to the completion of the recording of a block of one sequential identity to move to one of its actuated positions the element then indexed into operative relationship with the actuating member,
- a second actuating member also disposed to have operative relationship with successive ones of said elements and responsive to the completion of the recording of a block of a different sequential identity to move to the other one of its actuated positions the element then indexed into operative relationship with said second actuating member, first and second indicating devices positioned relative to the actuating members to be alternatively operable by an actuated one of said elements in accordance with its actuated position upon indexing of the rotary member incident to the recording of the prescribed number of additional code signals following actuation of the element by the corresponding actuating member.

References Cited by the Examiner

UNITED STATES PATENTS

| | | | |
|---|---|---|---|
| 2,946,843 | 7/60 | Stiles | 178—2 |
| 2,946,844 | 7/60 | Stiles et al. | 178—2 |

NEIL C. READ, *Primary Examiner.*

ROBERT H. ROSE, *Examiner.*